(12) United States Patent
Clark et al.

(10) Patent No.: US 9,243,751 B2
(45) Date of Patent: Jan. 26, 2016

(54) COMPRESSED GAS STORAGE UNIT

(71) Applicant: LightSail Energy, Inc., Berkeley, CA (US)

(72) Inventors: Laurie Clark, Ogden, UT (US); Edwin P. Berlin, Jr., Oakland, CA (US); Danielle A. Fong, Oakland, CA (US); Stephen E. Crane, Santa Rosa, CA (US)

(73) Assignee: LightSail Energy, Inc., Berkeley, CA (US)

( * ) Notice: Subject to any disclaimer, the term of this patent is extended or adjusted under 35 U.S.C. 154(b) by 216 days.

(21) Appl. No.: 13/745,685

(22) Filed: Jan. 18, 2013

(65) Prior Publication Data

US 2013/0186597 A1 Jul. 25, 2013

Related U.S. Application Data

(60) Provisional application No. 61/589,254, filed on Jan. 20, 2012.

(51) Int. Cl.
*F17C 1/06* (2006.01)
*F28F 1/10* (2006.01)
(Continued)

(52) U.S. Cl.
CPC . *F17C 1/06* (2013.01); *B29C 49/06* (2013.01); *F01K 25/00* (2013.01); *F01K 27/00* (2013.01);
(Continued)

(58) Field of Classification Search
CPC ............... F17C 1/06; F17C 1/04; F17C 1/02; F17C 1/16; F17C 13/002; B29C 49/22; B29C 49/06; F01K 25/00; F01K 27/00; F02C 6/16; F28D 20/00; F28F 1/10; F28F 1/24

USPC ........... 220/590, 589, 588, 586, 23.88, 23.83, 220/FOR. 127; 264/516; 156/172
See application file for complete search history.

(56) References Cited

U.S. PATENT DOCUMENTS 1,696,725 A 12/1928 Murray
1,930,285 A 10/1933 Robinson
(Continued)

FOREIGN PATENT DOCUMENTS

GB 488534 7/1938
GB 544952 5/1942
(Continued)

OTHER PUBLICATIONS

"Filament Wound Pressure Vessel Design", Advanced Design and Optimization Technologies, 2000-2002, pp. 1-3, Advanced Design and Optimization Technologies.
(Continued)

*Primary Examiner* — Robert J Hicks

(57) ABSTRACT

Embodiments of the present invention relate to compressed gas storage units, which in certain applications may be employed in conjunction with energy storage systems. Some embodiments may comprise one or more blow-molded polymer shells, formed for example from polyethylene terephthalate (PET) or ultra-high molecular weight polyethylene (UH-MWPE). Embodiments of compressed gas storage units may be composite in nature, for example comprising carbon fiber filament(s) wound with a resin over a liner. A compressed gas storage unit may further include a heat exchanger element comprising a heat pipe or apparatus configured to introduce liquid directly into the storage unit for heat exchange with the compressed gas present therein.

5 Claims, 28 Drawing Sheets

(51) Int. Cl.

| | | |
|---|---|---|
| *B29C 49/06* | (2006.01) | |
| *F01K 27/00* | (2006.01) | |
| *F28D 20/00* | (2006.01) | |
| *F28F 1/24* | (2006.01) | |
| *F01K 25/00* | (2006.01) | |
| *F02C 6/16* | (2006.01) | |
| *F28F 13/00* | (2006.01) | |
| *F28D 1/06* | (2006.01) | |
| *F28D 15/02* | (2006.01) | |
| *B29L 31/00* | (2006.01) | |
| *B29C 49/00* | (2006.01) | |

(52) U.S. Cl.
CPC . *F02C 6/16* (2013.01); *F28D 20/00* (2013.01); *F28F 1/10* (2013.01); *F28F 1/24* (2013.01); *B29C 49/00* (2013.01); *B29C 2791/001* (2013.01); *B29L 2031/7156* (2013.01); *F28D 1/06* (2013.01); *F28D 15/02* (2013.01); *F28D 2020/006* (2013.01); *F28D 2020/0026* (2013.01); *F28D 2020/0065* (2013.01); *F28D 2020/0078* (2013.01); *F28F 13/00* (2013.01); *F28F 2215/06* (2013.01); *F28F 2280/02* (2013.01); *Y02E 60/142* (2013.01)

(56) References Cited

U.S. PATENT DOCUMENTS

| | | | |
|---|---|---|---|
| 1,982,852 | A | 12/1934 | Bergstrom et al. |
| 2,171,973 | A * | 9/1939 | Hermann ............... 220/584 |
| 2,253,093 | A | 8/1941 | Raichle et al. |
| 2,335,038 | A | 11/1943 | Bridges |
| 2,370,677 | A | 3/1945 | Mapes |
| 2,373,038 | A | 4/1945 | Lindsay |
| 2,376,831 | A | 5/1945 | Stearns |
| 2,593,714 | A | 4/1952 | Robinson |
| 2,693,291 | A | 11/1954 | Alderfer |
| 3,034,537 | A | 5/1962 | Seaman et al. |
| 3,113,831 | A * | 12/1963 | Coale ..................... 264/512 |
| 3,114,968 | A * | 12/1963 | Rudelick ............. 29/890.051 |
| 3,133,659 | A | 5/1964 | Dobell et al. |
| 3,189,510 | A | 6/1965 | Eldred |
| 3,252,610 | A | 5/1966 | Greenlee |
| 3,280,567 | A | 10/1966 | Elliott et al. |
| 3,489,311 | A * | 1/1970 | Burgoa et al. ............ 220/592.25 |
| 3,523,063 | A | 8/1970 | Zerna |
| 3,715,266 | A | 2/1973 | Winters et al. |
| 3,913,624 | A | 10/1975 | Ball |
| 3,940,001 | A * | 2/1976 | Haefner et al. ............ 215/12.2 |
| 3,994,431 | A | 11/1976 | Steiner |
| 4,113,132 | A | 9/1978 | Steiner |
| 4,342,612 | A | 8/1982 | Lalikos et al. |
| 4,380,252 | A | 4/1983 | Gray et al. |
| 4,393,106 | A * | 7/1983 | Maruhashi et al. ........ 428/36.7 |
| 4,438,719 | A * | 3/1984 | Finsterwalder ............ 114/74 A |
| 4,568,394 | A | 2/1986 | Cassell |
| 4,783,232 | A | 11/1988 | Carbone et al. |
| 4,925,044 | A * | 5/1990 | Hembert .................... 220/589 |
| 4,946,056 | A * | 8/1990 | Stannard .................... 220/584 |
| 5,025,943 | A * | 6/1991 | Forsman .................... 220/589 |
| 5,150,812 | A * | 9/1992 | Adams ....................... 220/589 |
| 5,287,987 | A * | 2/1994 | Gaiser ....................... 220/589 |
| 5,484,079 | A | 1/1996 | Carter et al. |
| 5,568,878 | A | 10/1996 | LeBreton |
| 5,577,630 | A * | 11/1996 | Blair et al. ................. 220/581 |
| 5,678,296 | A | 10/1997 | Fleischhacker et al. |
| 5,954,672 | A | 9/1999 | Schwager |
| 5,968,671 | A | 10/1999 | Joseph |
| 7,124,908 | B2 | 10/2006 | Sanders |
| 7,300,014 | B2 | 11/2007 | Allen |
| 7,641,949 | B2 | 1/2010 | DeLay et al. |
| 7,971,740 | B2 * | 7/2011 | Shimada et al. ........... 220/4.12 |
| 8,087,536 | B2 | 1/2012 | Koussios et al. |
| 2003/0192315 | A1 * | 10/2003 | Corcoran .................. 60/645 |
| 2004/0010243 | A1 | 1/2004 | Klint |
| 2004/0060304 | A1 | 4/2004 | Aceves et al. |
| 2005/0260373 | A1 | 11/2005 | DeLay et al. |
| 2007/0000561 | A1 | 1/2007 | Handa |
| 2008/0075358 | A1 | 3/2008 | Yu et al. |
| 2008/0216487 | A1 | 9/2008 | Handa |
| 2008/0274006 | A1 | 11/2008 | Bright et al. |
| 2009/0057319 | A1 | 3/2009 | Schlag |
| 2009/0095796 | A1 | 4/2009 | Prakash |
| 2009/0236349 | A1 * | 9/2009 | Mueller et al. ............ 220/590 |
| 2011/0204063 | A1 * | 8/2011 | Breuer et al. ............. 220/590 |
| 2011/0204064 | A1 | 8/2011 | Crane et al. |

FOREIGN PATENT DOCUMENTS

| | | |
|---|---|---|
| GB | 547642 | 9/1942 |
| GB | 548483 | 10/1942 |
| GB | 958055 | 5/1964 |
| GB | 2 244 179 A | 11/1991 |
| JP | 9028639 A | 2/1997 |
| JP | 9178056 A | 7/1997 |
| JP | 11022871 A | 1/1999 |
| JP | 2002-168396 A | 6/2002 |
| JP | 2007205503 A | 8/2007 |
| KR | 900003293 B1 | 5/1990 |
| WO | WO 00/53367 A1 | 9/2000 |

OTHER PUBLICATIONS

Heather L. Giacoletto, "The art of filament winding", Reinforced Plastics, Oct. 2002, pp. 30-31, Elsevier Science Ltd.

Lei Zu et al., "Design of filament-wound circular toroidal hydrogen storage vessels based on non-geodesic fiber trajectories", International Journal of Hydrogen Energy, 2009, pp. 660-670, vol. 35, Elsevier Ltd.

Lei Zu et al., "Design of filament-wound isotensoid pressure vessels with unequal polar openings", Composite Structures, 2009, pp. 2307-2313, vol. 92, Elsevier Ltd.

Bora Balya, "Design and Analysis of Filament Wound Composite Tubes", A Thesis Submitted to The Graduate School of Nature and Applied Sciences of Middle East Technical University, Dec. 2004, pp. iii-144.

Ping Xu et al., "Optimal design of high pressure hydrogen storage vessel using an adaptive genetic algorithm", International Journal of Hydrogen Energy, 2009, pp. 2840-2846, vol. 35, Elsevier Ltd.

"High-strength (5 GPa) steel wire: an atom-probe study", Applied Surface Science 67, 1993, pp. 328-333, Elsevier Science Publishers B.V.

International Search Report and Written Opinion for PCT/US2011/029083 filed on Mar. 18, 2011.

Scott W. Beckwith, "Filament Winding—The String and the Glue", Beckwith Technology Group, Composite Fabrication, Jan. 1998.

Jenny Heth, "From Art to Science: A prepreg overview", High-Performance Composites, May/Jun. 2000, pp. 32-36, Gardner Publications Inc., Cincinnati, Ohio.

International Search Report and Written Opinion for PCT/US2013/022199 filed on Jan. 18, 2013.

Extended European Search Report and Written Opinion for PCT/US2013/022199, dated Nov. 3, 2015.

* cited by examiner

| Fiber | Strength (ksi) | Density (lb/in³) | Specific Strength (x 10³ in) | Unit Price ($/lb) | Safety Factor |
|---|---|---|---|---|---|
| Standard Modulus Carbon (In large volume) - PAN Precursor | 580 | 0.0648 | 8,950 | 6.00 | 2.25 |
| UHMWPE (foreign source) | 471 | 0.0338 | 13,920 | 2.85 | 5 |
| E-glass | 285 | 0.0929 | 3,068 | 0.85 | 5 |
| Standard Modulus Carbon (In low volume) - PAN Precursor | 580 | 0.0648 | 8,951 | 12.00 | 2.25 |
| S1-Fiberglass | 350 | 0.0918 | 3,813 | 3.00 | 3.4 |
| S2-Fiberglass | 485 | 0.0918 | 5,283 | 5.00 | 3.4 |
| Basalt | 400 | 0.0980 | 4,082 | 3.00 | 5 |
| Intermediate Modulus Carbon - PAN Precursor | 796 | 0.0648 | 12,284 | 25.00 | 2.25 |
| Low Modulus Carbon - Lignin Precursor | 250 | 0.0648 | 3,858 | 3.00 | 5 |
| Polypropylene | 87 | 0.0302 | 2,877 | 1.00 | 5 |
| Steel Music Wire | 380 | 0.2826 | 1,345 | 1.90 | 5 |
| UHMWPE (Domestic) | 471 | 0.0338 | 13,918 | 25.00 | 5 |

FIG. 8

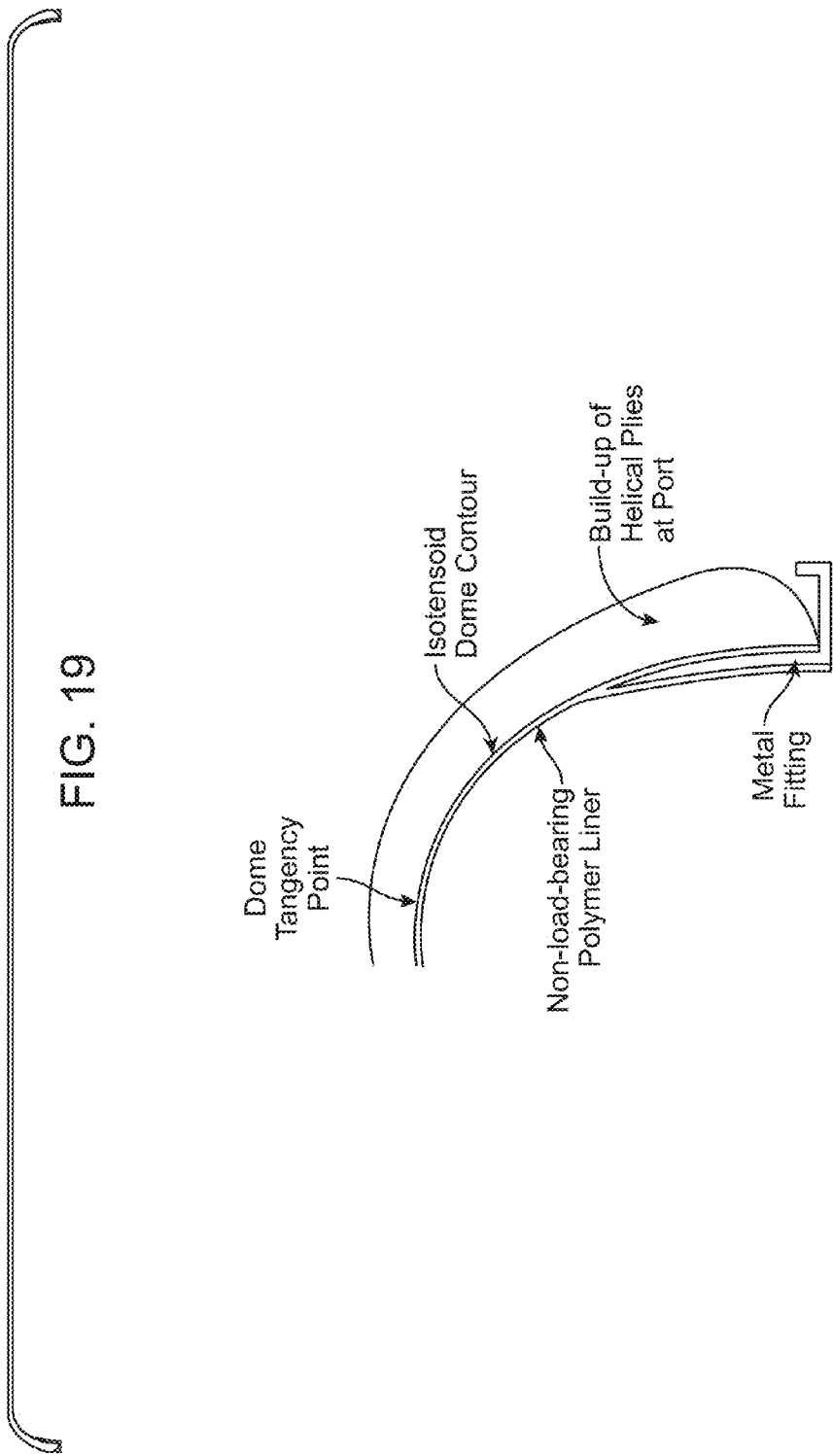

- Combinations of Configurations are Possible
- (Parenthesis) indicate optional functionality or optional presence of element

| Configuration | ID | 1 | 2 | 3 | 4 |
|---|---|---|---|---|---|
| | Description | Energy Storage | Energy Delivery | Heat Engine | Heat Engine |
| | Storage | to storage | from storage | No storage | No storage |
| | Gas Flow | Open System; Fig. 9BA; upward to storage | Open System; Fig. 9BB; downward from storage | Closed Circuit; Fig. 9BC; counter-clock-wise/clockwise | Open System; Fig. 9BD; Left→Right/ Right→Left |
| Cylinder No. | 28502 | Compressor | Expander | Compressor/Expander | Compressor/expander |
| | 28504 | Compressor | Expander | Expander/Compressor | Expander/compressor |
| Valve No. Connection: Port a - port _ | 28506 | b | c | d | b |
| | 28508 | c | b | d | d |
| | 28510 | b | c | d | d |
| | 28512 | c | b | d | b |
| Counterflow Heat Exchanger 28538 | Side 1 | N/A | N/A | Cold/Hot | N/A |
| | Side 2 | | | Hot/Cold | |
| Gas-Gas Heat Exchanger | 28514 | -- | -- | -- | -- |
| | 28516 | (act as heater) | (act as cooler) | (act as heater/ act as cooler) | (act as heater/ act as cooler) |
| | 28518 | -- | -- | -- | -- |
| | 28520 | (act as heater) | (act as cooler) | (act as cooler/ act as heater) | (act as cooler/ act as heater) |
| Liquid-Gas Heat Exchanger | 28522 | (act as heater) | (act as cooler) | (act as heater/ act as cooler) | (act as heater/ act as cooler) |
| | 28524 | (act as heater) | (act as cooler) | (act as cooler/ act as heater) | (act as cooler/ act as heater) |
| External Thermal Node | 28526 | (Heat Sink) | (Heat Source) | (Heat Sink/ Heat Source) | (Heat Sink/ Heat Source) |
| | 28528 | (Heat Sink) | (Heat Source) | Heat Sink/ Heat Source | Heat Sink/ Heat Source |
| | 28530 | (Heat Sink) | (Heat Source) | Heat Sink/ Heat Source | (Heat Sink/ Heat Source) |
| | 28532 | (Heat Sink) | (Heat Source) | (Heat Source/ Heat Sink) | (Heat Source/ Heat Sink) |
| | 28534 | (Heat Sink) | (Heat Source) | (Heat Source/ Heat Sink) | (Heat Source/ Heat Sink) |
| | 28536 | (Heat Sink) | (Heat Source) | (Heat Source/ Heat Sink) | (Heat Source/ Heat Sink) |
| | 28540 | N/A | N/A | Heat Sink or Heat Source | Heat Sink or Heat Source |

FIG. 28A

Heat engine + Compressor (storage)

Heat engine + expander (energy delivery)

SIDE VIEW

TOP VIEW

COMPRESSED GAS STORAGE UNIT

CROSS-REFERENCE TO RELATED APPLICATION

The instant nonprovisional patent application claims priority to U.S. Provisional Patent Application No. 61/589,254, filed Jan. 20, 2012 and incorporated by reference in its entirety herein for all purposes.

BACKGROUND

Compressed air is capable of storing energy at densities comparable to lead-acid batteries. Moreover, compressed gas does not involve issues associated with a battery such as limited lifetime, materials availability, or environmental friendliness. Thus, there is a need in the art for apparatuses and methods allowing the creation of storage units for compressed gas.

SUMMARY

Embodiments of the present invention relate to compressed gas storage units, which in certain applications may be employed in conjunction with energy storage systems. Some embodiments may comprise one or more blow-molded polymer shells, formed for example from polyethylene terephthalate (PET) or ultra-high molecular weight polyethylene (UHMWPE). Embodiments of compressed gas storage units may be composite in nature, such as comprising high strength (e.g. carbon) fiber wound in the presence of a resin over a liner. The compressed gas storage unit may further include a heat exchanger element such as a heat pipe, finned tube, or apparatus introducing liquid directly into the storage unit for heat exchange with the compressed gas present therein.

BRIEF DESCRIPTION OF THE DRAWINGS

FIG. 4AA shows another embodiment of a multi-shell compressed gas storage unit.

FIG. 4BA shows another embodiment of a multi-shell compressed gas storage unit.

FIG. 8 shows application of a figure of merit to a number of different fiber types.

FIGS. 19-25 show various views of a compressed gas storage unit according to an embodiment.

FIG. 28A shows various basic operational modes of the system of FIG. 28.

DESCRIPTION

U.S. Patent Publication No. 2011/0115223 ("the '223 Publication") describing an energy storage and recovery system employing compressed gas as an energy storage medium, is hereby incorporated by reference in its entirety for all purposes.

Figure 1:
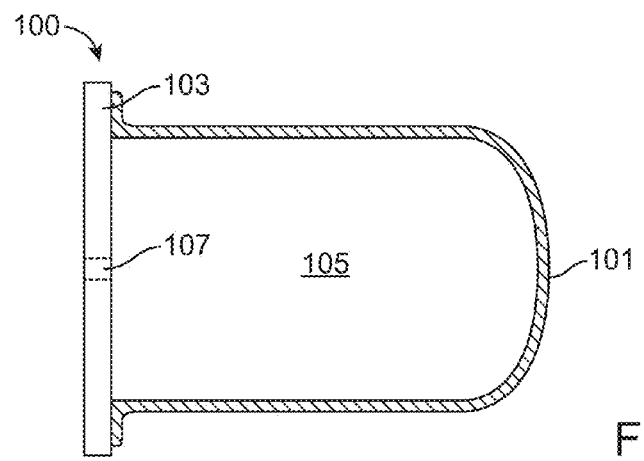
FIG. 1 shows a simplified cross-sectional view of a storage unit for compressed gas according to an embodiment.

FIG. 1 shows a simplified cross-sectional view of a storage unit 100 for compressed gas according to an embodiment. Storage unit 100 comprises shell 101 and end piece 103 which together enclose an interior space 105. In certain embodiments, the end piece may comprise a boss. The end piece defines a port 107 through which gas can enter or leave the storage unit. FIG. 1 is highly simplified and drawn for purposes of illustration, and thus the relative dimensions may not reflect actual values.

Figure 1A:
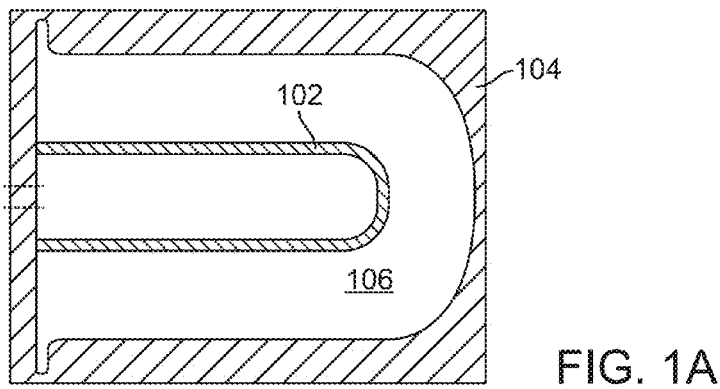
FIGS. 1A-B show highly simplified views of a process of fabricating a compressed gas storage unit utilizing blow molding.

In this particular embodiment, a blow molding technique is employed to form the storage unit 100. Specifically, as shown in FIG. 1A a parison 102 comprising hollow or concave plastic material, is inserted into a mold 104 defining an internal cavity 106. The parison 102 may comprise one or more materials capable of stretching in response to an applied pressure.

For example, the parison may typically comprise a polymer material, which may be thermoplastic, comprising relatively long polymer chains. Stretching of the polymer chain in response to an applied pressure, desirably transmits force along a direction of the chains, straightening them out and thereby allowing resulting internal tension to be taken up by the strong covalent bonds extant between elements within the chains.

Moreover, the Poisson effect may be observed in a blow molding process. Specifically, a stretching may occur in multiple directions on the surface of the vessel. As the blow molded material is stretched in a plane it becomes thinner, thereby further constraining polymer chains to lie within that plane.

An example of a polymer which may be used in blow molding is polyethylene terephthalate (PET or PETE). Another example of a polymer which may be suited for the formation of compressed gas storage units via blow molding techniques, is ultra-high molecular weight polyethylene (UHMWPE). Such UHMWPE materials may be characterized by chains having relatively high molecular weight (e.g. $>1 \times 10^6$).

Figure 1B:
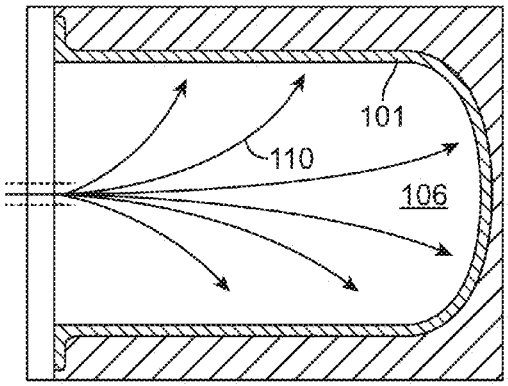

As shown in FIG. 1B, a gas 110 is then introduced under pressure into the parison 102 disposed within the cavity 106 of the mold. The force resulting from the pressure of the blown gas, causes the material of the parison to expand against the internal walls of the mold defining the chamber, thereby forming the shell 101.

In later steps, the mold is removed and in certain embodiments may be reused. The end piece 103 furnishing the port 107 to allow the passage of gas into the shell, is then provided.

The blow molding process shown in FIGS. 1A-B is highly simplified. Additional steps may be performed in various embodiments.

For example, certain blow molding processes may involve the heating and/or cooling of individual elements at the same or different times. For example, the parison and/or the mold may be heated or cooled at various points in the process.

Other types of processes which can be performed at various stages of blow molding include spinning, injection, extrusion, curing, trimming, and/or milling. Various types of additional materials, for example in the liquid or gas phase, can also be introduced during the process in order to achieve the desired structure.

The following equation provides a Figure of Merit (FOM) as a measure to assess relative costs of blow molded compressed gas storage units made from various materials, with a lower FOM representing a lower cost solution:

$$FOM = \left(\frac{SF}{\overline{\sigma}_p}\right)\left[\$_p + \$_r\left(\frac{1-v_p}{v_p}\right)\left(\frac{\rho_r}{\rho_p}\right)\right]$$

SF=Safety Factor
$\overline{\sigma}_p$=Specific Strength of polymer after blow molding
$\$_p$=Unit Price of polymer
$\$_r$=Unit Price of Resin
$v_p$=Polymer Volume Fraction
$\rho_r$=Resin Density
$\rho_p$=Polymer Density While the above figures illustrate an example wherein blow molding techniques are employed to fabricate a shell having a concave shape, various types of shapes could be formed depending upon the profile of the interior cavity of the mold. Examples of alternative shapes include but are not limited to cylindrical and spherical. The latter shape may offer a benefit by consuming a least amount of shell material per volume of gas enclosed.

Moreover, while FIGS. 1A-B show a particular example of fabricating a compressed gas storage unit having a single shell by injection molding, embodiments of the present invention are not limited to having this or any number of shells. Thus particular embodiments could comprise a plurality of blow molded shells arranged in a nested configuration, for example as is shown at least in the particular embodiments of FIGS. 2-4BA.

There is no theoretical limit to a number of shells which may be employed to form a blow molded compressed gas storage unit. Examples of a number of blow molded shells which may comprise a compressed gas storage unit, include but are not limited to 1, 2, 3, 4, 5, 6, 7, 8, 9, 10, 15, 20, 50, 75, and 100 or an even greater number.

Embodiments of compressed gas storage units formed by blow molding, and particularly those comprising multiple shells, may be expected to contain gas at high pressures. Examples of internal gas pressures that the blow molded compressed gas storage units may be expected to withstand, including but are not limited to 100 psig, 200 psig, 250 psig, 500 psig, 1000 psig, 1500 psig, 2000 psig, 2500 psig, 3000 psig, 3500 psig, 4000 psig, 4500 psig, 5000 psig, 5500 psig, and 6000 psig. Examples of internal volumes which may be defined within compressed gas storage units formed by blow molding, include but are not limited to 0.002 m$^3$, 0.005 m$^3$, 0.01 m$^3$, 0.025 m$^3$, 0.05 m$^3$, 0.1 m$^3$, 0.5 m$^3$, 1 m$^3$, 2 m$^3$, 2.5 m$^3$, 3 m$^3$, 4 m$^3$, 5 m$^3$, 10 m$^3$.

Some embodiments comprising multiple shells could be formed by a succession of blow molding steps performed within the same mold. That is, blow molding of a first parison to form a first shell, could be followed by in turn by insertion of a second parison and blow molding to form the second shell against the first shell.

According to certain embodiments, the parison could include one or more raised features such as ribs. Upon stretching of the parison within the internal cavity of the mold, these ribs could contact the mold wall to serve as stand offs defining spaces that are enclosed within the wall of the storage unit. Such spaces could remain open, or could later be filled with other materials such as gases or liquids in order to achieve a desired effect. For example, in certain embodiments the intervening material could comprise a heat exchange fluid. The resulting shape of such a multi-shell structure is shown simplified in cross-section in FIG. 2, with space 203 lying between shells 202 and 204 comprising the unit 206.

Moreover, in certain embodiments intermediate steps could be performed between blow molding steps to introduce in-situ, materials intervening between successive shells. That is, the first molded shell could be exposed to a material imparting desired characteristics, prior to blow molding of the second shell. The resulting shape of such a structure 300 comprising multiple blow molded shells 302 and 304 including intervening layer 306, is shown in simplified cross-section in FIG. 3.

Examples of such intermediate materials may include but are not limited to adhesives, epoxies, surfactants, sealants, thermal insulators, thermal conductors, corrosion-resistant layers, diffusion barriers, foaming agents, materials affecting optical properties, water, air, and/or silicone rubber.

Figure 2:
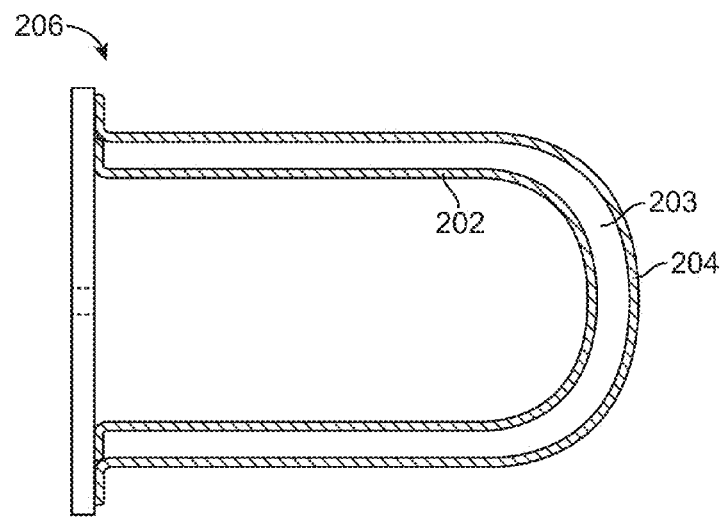
FIG. 2 shows an embodiment of a multi-shell compressed gas storage unit.
Figure 3:
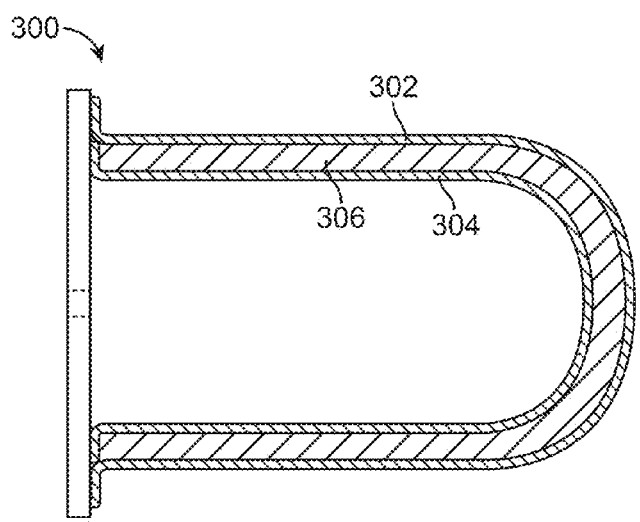
FIG. 3 shows another embodiment of a multi-shell compressed gas storage unit.

While FIGS. 2 and 3 show embodiments of compressed gas storage units comprising multiple shells successively blow molded in-situ within a same mold, this is not required.

Alternative embodiments of compressed gas storage units comprising multiple shells could comprise a plurality of shells formed by blow molding processes, followed by assembly of the plurality of shells in a nested configuration.

Figure 4A:
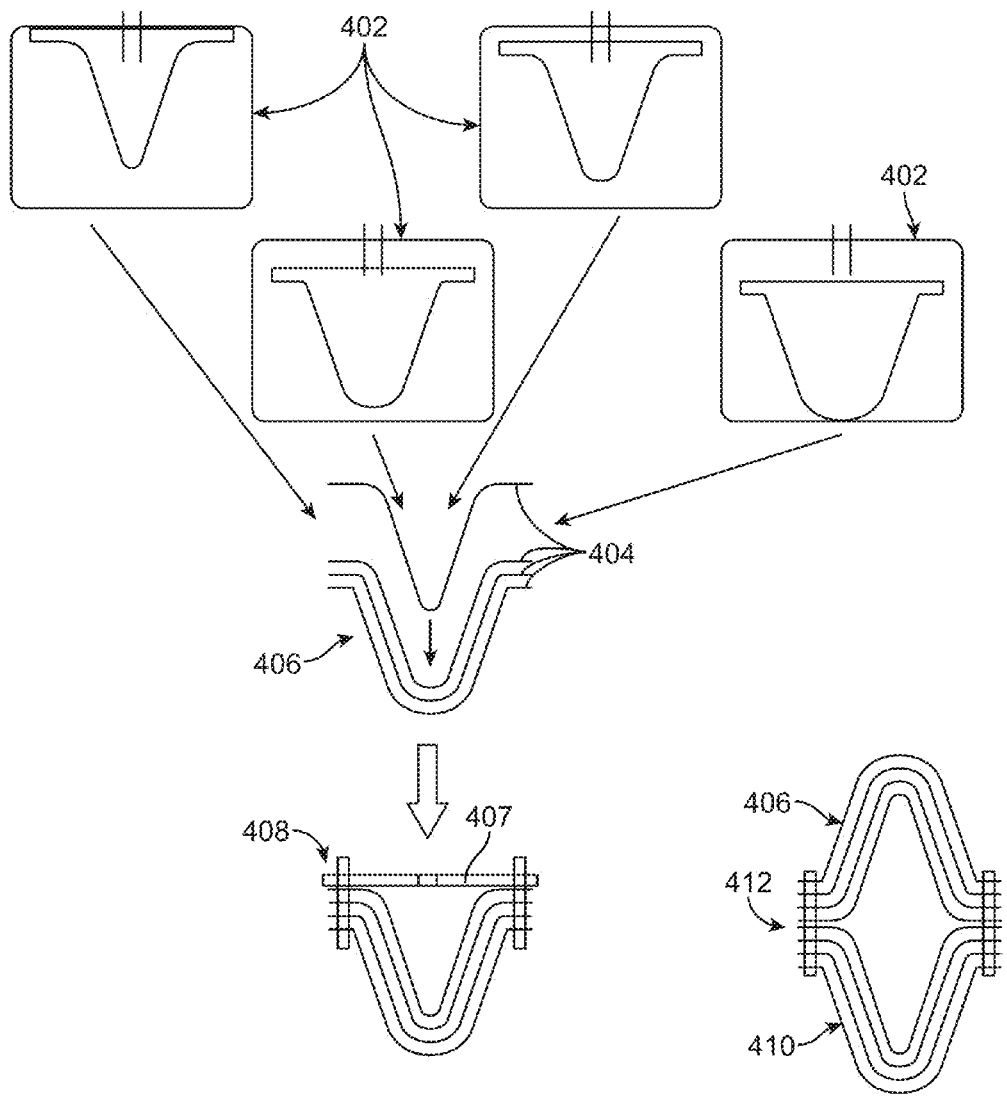
FIG. 4A shows a process utilizing a plurality of molds to form a multi-shell compressed gas storage unit according to an embodiment.

One such embodiment is shown in FIG. 4A, where mold(s) 402 of the same size are used to blow mold a plurality of identical shells 404 having a conical shape. Those shells are then combined to form the assembled shell 406, and an end piece 407 is added to create the compressed gas storage unit 408.

As shown in the alternative embodiment of FIG. 4AB, in certain embodiments the assembled shell 406 may then be coupled with another assembled shell 410 to form the resulting storage unit 412. The shells 406 and 408 may be maintained in contact with one another using bonding element(s), for example a penetrating element such as a bolt as shown, or alternatively using a bonding element such as an adhesive, or a clamp.

Figure 4B:
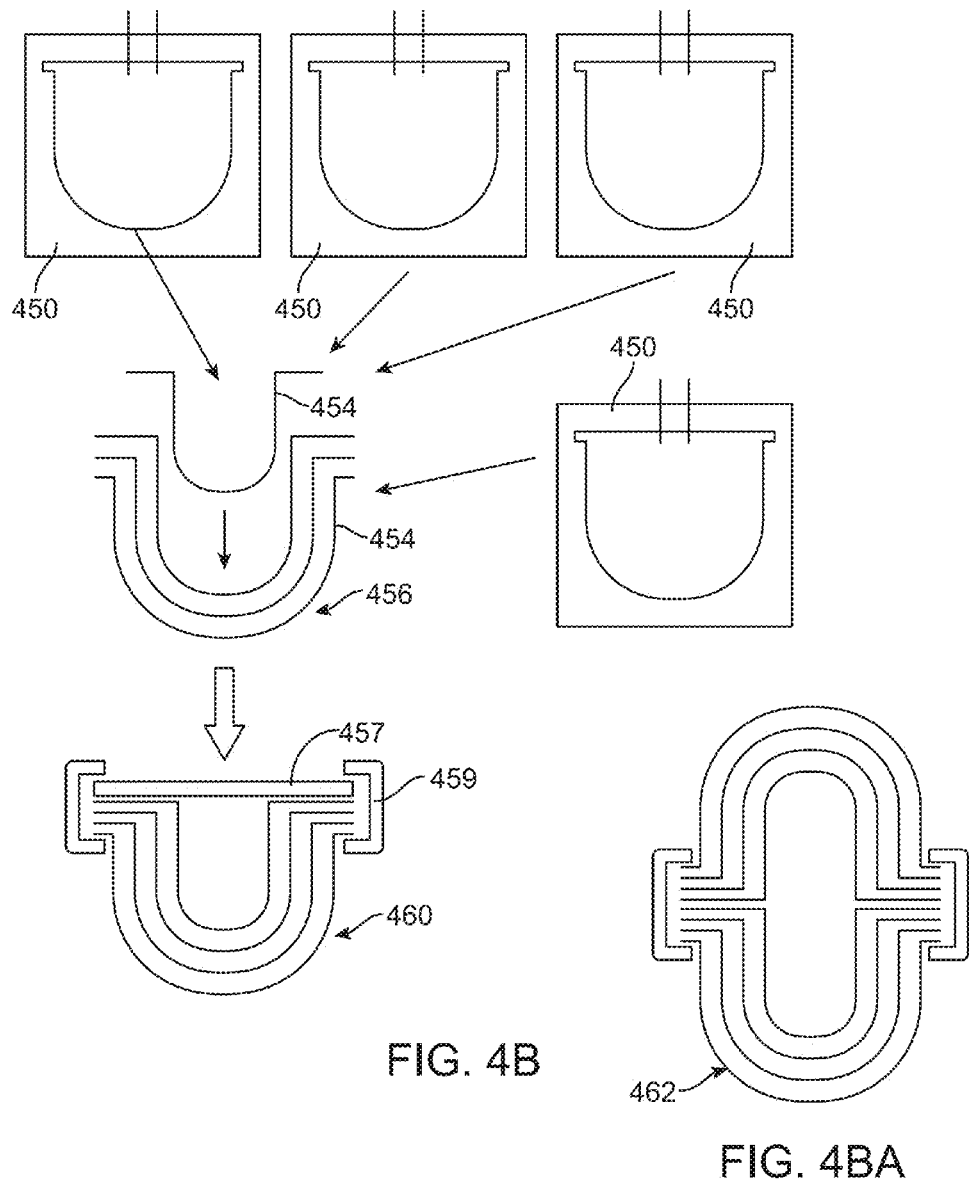
FIG. 4B shows a process utilizing a plurality of molds to form a multi-shell compressed gas storage unit according to an embodiment.

Another embodiment is shown in FIG. 4B, where mold(s) 450 of different sizes are used to blow mold a plurality of shells 454 of different sized hemispheres. Those shells are then combined to form the assembled shell 456, with an end piece 457 attached thereto by a clamp 459 to create the compressed gas storage unit 458.

As shown in the alternative embodiment of FIG. 4AB, in certain embodiments the assembled shell 456 may then be coupled with another assembled shell 460 to form the resulting storage unit 462. The shells 456 and 460 may be maintained in contact with one another using bonding element(s), for example a clamp as shown, or alternatively others such as an adhesive, or a bolt.

Use of a blow molding according to embodiments may allow the fabrication of a compressed gas storage unit having desired shapes or features. For example, FIGS. 5A-CB show the use of blow molding to fabricate an embodiment of a compressed gas storage unit having a flange feature. In particular, following insertion of the parison 500 into mold 502 featuring internal projections 504 (FIG. 5A), in FIG. 5B the parison is expanded by blow molding. The resulting flange 506 is produced by the material of the parison conforming to the projection in response to the applied pressure.

Figure 5A:
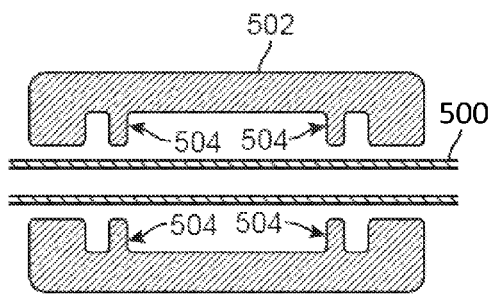
FIGS. 5A-CB show the use of blow molding to fabricate an embodiment of a compressed gas storage unit having a flange feature according to an embodiment.
Figure 5B:
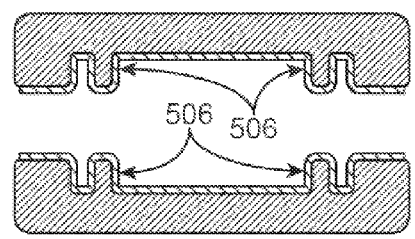
FIG. 5D shows an alternative embodiment of a mold for forming a compressed gas storage unit having a flange feature.
FIG. 5E shows an embodiment of a multi-shell compressed gas storage unit having a flange feature.

As shown in FIGS. 5B-CA, subsequent cutting along the dashed lines yields a flange insert 508 of the same material as the mold (which may be metal). This flange insert 508 may serve to further strengthen the flange feature and the resulting compressed gas storage unit.

Figure 5C:
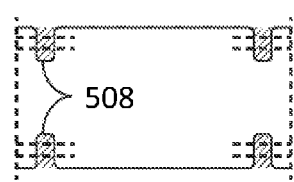
Figure 5C:
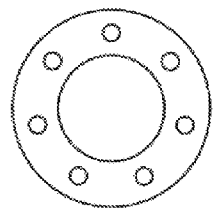

FIG. 5CB shows an end view after the subsequent drilling through the flange including the insert. The resulting fitting allows joining of the blow molded structure to another, for example an end cap or even another compressed gas storage unit to form a modular structure.

FIGS. 5A-CB show an embodiment comprising a compressed gas storage unit having a cylindrical shape. A possible benefit of having such a cylindrical tank shape is that the parison could be a simple straight tube. Extruded tubing may be available in sufficient length for large tanks, and cost less than an injection molded parison of the appropriate size.

Figure 5D:
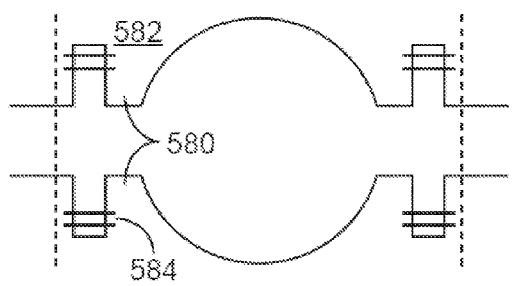

FIG. 5D shows a simplified cross-sectional view of a mold according to another embodiment comprising a spherical shape. In this embodiment, the flange portion 580 of the mold 582 is set off from the interior cavity, such that channels 584 for penetrating bolts do not enter the cavity. This can possibly strengthen the resulting blow molded spherical chamber under high pressure, and also eliminate a need to form an airtight seal with the interior through the bolt holes.

Figure 5E:
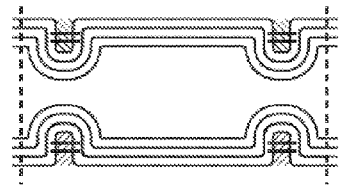

A multi-shell structure corresponding to that of FIGS. 5A-D could be fabricated by following the cutting step with the insertion of epoxy followed by an additional sequence of parison insertion/blow molding/cutting steps. An example of this is shown in simplified form in FIG. 5E.

1. A compressed gas storage unit comprising:
   a first shell formed by blow molding a first polymer parison within a mold; and
   a second shell disposed within the first shell and formed by blow molding a second polymer parison.

2. A compressed gas storage unit as in clause 1 wherein the second shell is formed by blow molding the second polymer parison within the first shell.

3. A compressed gas storage unit as in any of the previous clauses wherein the second shell is inserted into the first shell.

4. A compressed gas storage unit apparatus as in any of the previous clauses wherein the second shell is in contact with the first shell.

5. A compressed gas storage unit apparatus as in any of the previous clauses further comprising an intervening material between the second shell and the first shell.

6. A compressed gas storage unit apparatus as in any of the previous clauses wherein the intervening material comprises an epoxy.

7. A compressed gas storage unit apparatus as in any of the previous clauses wherein the first shell further comprises a flange feature.

8. A compressed gas storage unit apparatus as in any of the previous clauses wherein the first shell comprises ultra high molecular weight polyethylene (UHMWPE).

9. A compressed gas storage unit apparatus as in any of the previous clauses wherein the first shell comprises polyethylene terephthalate (PET).

10. A compressed gas storage unit apparatus as in any of the previous clauses wherein the first shell has a shape comprising a cylinder, a sphere, a hemisphere, or a cone.

11. A compressed gas storage unit apparatus as in any of the previous clauses further comprising a wound filament in contact with the first shell.

12. A method of fabricating a compressed gas storage unit, the method comprising:
   disposing a first polymer parison within a mold defining a cavity;
   blow molding the first polymer parison within the mold to create a first shell conforming to a shape of the cavity; and
   providing a second shell within the first shell.

13. A method as in clause 12 wherein providing the second shell comprises:
   disposing a second polymer parison within the first shell; and
   blow molding the second polymer parison within the first shell to define the second shell.

14. A method as in any of the previous clauses wherein providing the second shell comprises:
   blow molding the second shell from a second polymer parison within a second mold; and
   inserting the second shell within the first shell.

15. A method as in any of the previous clauses further comprising introducing a material within the first shell prior to providing the second shell.

16. A method as in any of the previous clauses wherein the material comprises an epoxy.

17. A method as in any of the previous clauses wherein the shape of the cavity is cylindrical.

18. A method as in any of the previous clauses wherein the shape of the cavity is spherical.

19. A method as in any of the previous clauses wherein the first polymer parison comprises ultra high molecular weight polyethylene (UHMWPE) or polyethylene terephthalate (PET).

20. A method as in any of the previous clauses wherein the first shell comprises polyethylene terephthalate (PET).

21. A method as in any of the previous clauses further comprising winding a filament around the first shell.

While the above figures have described the formation of one or more elements of a compressed gas storage unit by blow molding, this is not required. Other embodiments could employ alternative techniques and remain within the scope of the present invention.

For example, certain embodiments may employ the winding of filaments about a liner to fabricate a compressed gas storage unit out of composite materials. One candidate for such a composite material is carbon fiber.

Carbon fiber composites were introduced in the 1960s. As a structural material, benefits of carbon fiber composites include high specific strength (strength per unit weight) and specific modulus (stiffness per unit weight) when compared to other classes of materials.

Carbon fiber was initially a relatively expensive product, and saw its first usages in aerospace and defense applications. Now, costs are more competitive and usage is fairly widespread. Over the past decade, carbon fiber has found its way into many consumer products as well, particularly sporting goods such as bicycle frames, golf club shafts, and skis.

The mechanical properties of carbon fibers can vary. Strength values for carbon fiber range from about 500 to 725 ksi. Fibers are also commonly classified by their elastic modulus (or stiffness).

Standard modulus fibers are the cheapest fibers available today, and see widespread use in general aviation and consumer applications. Standard modulus fibers have an elastic modulus of approximately 33 Msi.

Intermediate modulus fibers are a more expensive fiber that may be used for stiffness critical structures, including military aircraft, launch vehicle structures, rocket motor casings, and primary loadbearing structure on commercial aircraft. Intermediate modulus fibers in general have an elastic modulus of approximately 42 Msi.

High modulus carbon fibers are more expensive fibers that are used in spacecraft applications or those requiring high dimensional stability. High modulus fibers in general have an elastic modulus of greater than 50 Msi.

The precursor is the raw material from which the carbon fiber is produced. Approximately 50% of the cost of carbon fiber may be attributable to the precursor used to synthesize the fiber, and processing of that precursor.

Currently much carbon fiber is made from one precursor material—polyacrylonitrile (PAN). PAN is petroleum based, and therefore its price fluctuates with crude oil prices.

Other precursor materials include pitch, novoloid (a phenolic), and rayon. These are more expensive to process, and the fiber itself may have a low modulus and less favorable mechanical properties. Fibers made from pitch, novoloid, and rayon may be used for high temperature and ablative aerospace applications.

Over the past decade, significant research activity has focused on the identification and processing of new, low cost precursors for carbon fiber. The range of potential precursor materials currently being evaluated includes cellulose, textile-grade PAN, and polyolefin-based precursors.

Since a large proportion of the cost of carbon fibers is associated with the precursor material, an opportunity exists for a low cost carbon fiber based on alternative precursors, especially those that come from renewable resources. Lignin is a polymer that occurs in the cell walls of plants. Lignin is a by-product of bio-diesel production: a given quantity of biomass produces more lignin than fuel.

Certain bio-fuel manufacturing processes result in unadulterated lignin being produced as a by-product. The lignin is in the form of dry flakes with low chloride content. The use of high quality Lignin precursors may allow the synthesis of carbon fibers having a stiffness of approximately 25 Msi, and a strength target of 250 ksi.

Standard modulus carbon fiber is synthesized from its precursor using a five-step manufacturing process comprising 1. Spinning, 2. Stabilizing, 3. Carbonizing, 4. Surface Treatment, and 5. Sizing. These steps are now described.

In the fiber spinning process, a mixture containing the precursor material is spun into individual filaments. The plastic mixture is pumped through small-orifice jets into a chamber where it solidifies into filaments. The internal atomic structure of the fiber is formed during this step. After spinning, the filaments are washed and stretched to the desired fiber diameter (typically 0.0002 to 0.0003 inch).

During stabilization, the spun polymer filaments are chemically altered to convert their linear atomic bonding to a more thermally stable ladder bonding. This is accomplished by heating the filaments in air to about 390-590° F. (200-300° C.) for 30-120 minutes, which causes them to pick up oxygen molecules from the air and rearrange their atomic bonding pattern.

After stabilization, filaments are carbonized by being heated in a furnace to a temperature of about 1,830-5,500° F. (1,000-3,000° C.) for several minutes. The furnace contains an inert gas to prevent the fibers from oxidizing. The process drives off the non-carbon atoms in the form of various gases. The remaining carbon atoms form tightly bonded carbon crystals that are aligned along the axis of the filament.

Intermediate modulus and high modulus fibers utilize additional processing after carbonizing, to strip off the outermost layers of the filament.

After carbonizing, the fiber surface is such that is will not adhere to composite resins and matrix materials, so it must undergo a surface treatment in which the surface is slightly oxidized.

After the surface treatment, the filaments are coated with a sizing agent that protects it from damage and ensures compatibility with the resin system. The coated fibers are wound onto cylinders called bobbins. The bobbins are loaded into a spinning machine and the filaments are bundled into yarns of various sizes, designated by thousands (K) of fibers.

Pricing for a given carbon fiber product may also depend upon the number of fibers in a yarn. Typical carbon fiber yarn sizes range from 1K to 120K, with even larger bundles expected to be available in the future. "Large tow" carbon fibers bundled in the 24K range and up, are less expensive than larger diameter fibers comprised of fewer filaments.

Factors other than the strength of particular materials can also influence the design and construction of cost-effective storage units. For example, the internal structure and expected highest pressure of an energy storage unit can also impact its design.

The process for manufacturing an energy storage unit can also affect its cost and performance. Certain embodiments may utilize a filament-wound composite pressure vessel with a liner, which may or may not be load-sharing. Apart from the liner, other design considerations for the pressure vessel include a thickness of the wall(s) sized to handle the forces expected to result from storage pressures.

In the United States, the American Society of Mechanical Engineers (ASME) Boiler and Pressure Vessel (B&PV) Code is a prevalent standard for design, fabrication, inspection and operation of installed pressure vessels. The B&PV Code is imposed by many states as an occupational safety measure. Section VIII of the B&PV Code applies to metallic and some (high pressure) composite tanks Section X of the B&PV Code covers some (low pressure) composite tank designs. Both Section VIII and Section X of the B&PV Code are incorporated by reference in their entireties herein for all purposes.

ASME B&PV Section X relates to fiber reinforced plastic pressure vessels made from carbon or glass fiber. Class I qualifies by testing to 6× design pressure with a burst safety factor of 2.25 for carbon fiber and of 3.5 for glass fiber, and maximum design pressures up to 3000 psi. Class II has mandatory design rules and acceptance tests, with maximum design pressures up to ~100 psi.

Class III of ASME B&PV Section X, including new appendix 8, relates to fully wrapped composite pressure vessels with non-load-sharing liners. These pressure vessels may be intended for hydrogen applications, with maximum design pressures up to 3600 psi.

New classes of ASME B&PV Section X may relate to fully wrapped composite pressure vessels with load-sharing liners.

Figure 6:
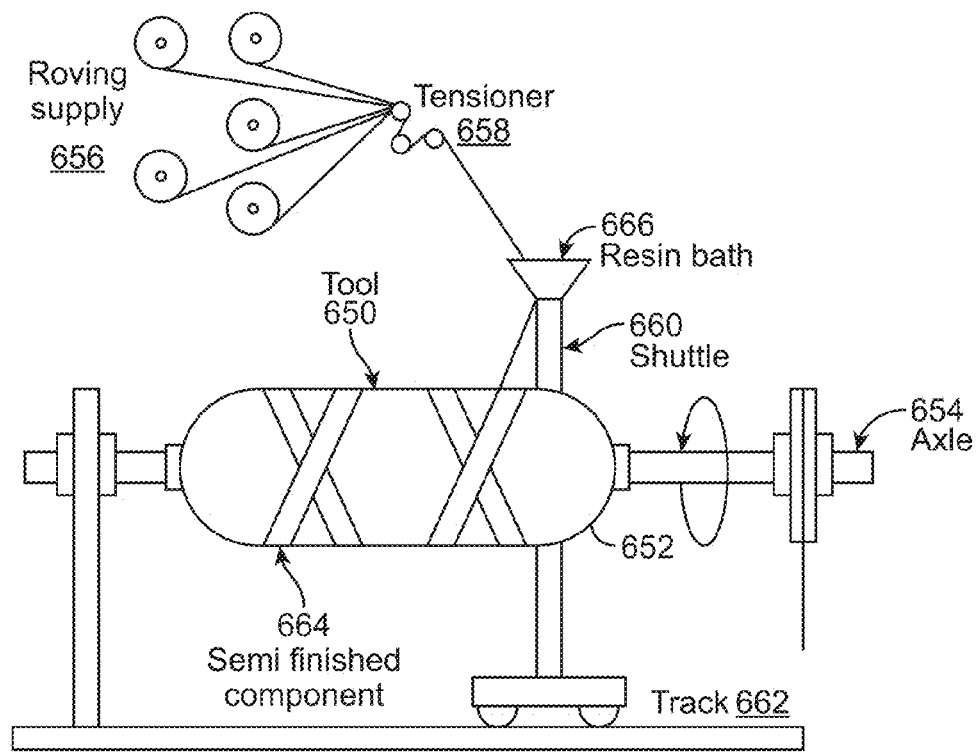
FIG. 6 is a simplified view of an embodiment of a tool which may be used to fabricate a composite filament-wound compressed gas storage unit.

FIG. 6 is a simplified view of an example of a tool which may be used to fabricate a composite filament-wound compressed gas storage unit according to an embodiment. The tool 650 comprises a mandrel 652 that is rotatable about an axle 654. A roving supply 656 of fiber is fed through a tensioner 658 to a shuttle 660 that is moveable upon a track 662. The shuttle 660 winds the fiber about the rotating mandrel to create a semi-finished component 664. This semi-finished component is later finished through other processes.

A tool employed for filament winding may utilize movement along multiple axes. For example, a rotational degree of freedom may be represented by the mandrel, and a linear degree of freedom represented by movement of the shuttle.

Other possible axes of motion for filament winding can include but are not limited to an in/out motion of a winding head and/or a wrist. Still another axis of motion may include up/down motion of a winding head.

The embodiment of FIG. 6 shows the fiber as being wet-wound through a resin bath 666, offering the possible benefit of reduced cost. However this is not required, and in alternative embodiments the resin could be pre-impregnated.

In such pre-impregnation approaches, a fiber bundle (such as a tow, strand, roving, tape, fabric, or yarn) is exposed to the resin prior to the winding process. At this time, the fiber bundle becomes impregnated within the resin. An initial heat curing step of the impregnated fiber bundle may then be performed, prior to storing the impregnated fiber (typically at lower than room temperature).

In some embodiments the pre-impregnated fiber may be stored by winding around a spool. An intervening material may or may not be employed between the pre-impregnated fiber layers, in order to prevent their adhesion to one another during storage.

The pre-impregnated fiber bundle may then be wound around the mandrel. A second heat cure of the wound filament/mandrel combination, serves to secure the wound filament to the mandrel.

Such a pre-impregnated fiber approach may offer certain benefits. One possible benefit is uniformity of resin impregnation of the fiber bundle, as compared with wet approaches. Another possible benefit is reduced exposure by workers to wet chemicals and fumes, during the filament winding process itself.

A variety of materials may be used as a resin in a filament wound tank according to various embodiments. Three types of thermosetting polymers include polyesters, vinyl esters, and epoxies. These are the three most common generic chemical families of resins used for filament winding.

Unsaturated polyesters are the most widely used and inexpensive winding resins on the market, with costs as low as $1 per lb. They are widely used for winding fiberglass pressure vessels and piping. Mechanical properties and chemical resistance is the lowest of the three types of resins.

Vinyl esters offer improved mechanical properties and chemical resistance. However, recent regulatory requirements in the United States have reduced the allowable amount of styrene emissions, and impose an increasingly stringent, costly, and time-consuming process for permitting and demonstrating compliance.

Despite the fact their relative expense, epoxies offer favorable mechanical properties. One epoxy resin system uses Epon Resin 826 with Epikure 9551 curing agent (both from Momentive Specialty Chemicals), currently priced at $2.46 per lb. Perhaps more importantly, epoxy resin systems are a more environmentally responsible choice since they have much a lower emissions factor than polyesters, do not contain styrene, and are not affected by the newest round of regulations.

Certain resin types may offer resistance to corrosion, a property which may be beneficial in environments containing water. Examples of such resins include but are not limited to phenolic, chlorendic, and bisphenol-A fumarate.

Thermoplastic materials may be used in resins. Thermoplastic materials may be cured by the application of heat. Examples of possible thermoplastic resins include but are not limited to:

polyamide-imide;
polyetheretherketone;
polyetherketoneketone;
polyarylsulfone;
polyether imide;
polyethersulfone; and
liquid crystal polymer.

In certain embodiments, the compressed gas storage unit may include a liner whose role is to form a gas-tight seal, with the surrounding wound fiber providing the necessary physical strength. The liner may or may not be load sharing. An example of a load sharing liner is one made from a metal such as aluminum, having a threshold wall thickness. An example of a non-load sharing liner may be one made from plastic and not exhibiting the requisite strength.

Embodiments of composite compressed gas storage units formed by filament winding, may be expected to contain gas a high pressures. Examples of internal gas pressures that the filament wound compressed gas storage units may be expected to withstand, including but are not limited to 100 psig, 200 psig, 250 psig, 500 psig, 1000 psig, 1500 psig, 2000 psig, 2500 psig, 3000 psig, 3500 psig, 4000 psig, 4500 psig, 5000 psig, 5500 psig, and 6000 psig, 7000 psig, and 10,000 psig. Examples of internal volumes which may be defined within compressed gas storage units formed by blow molding, include but are not limited to 0.002 $m^3$, 0.005 $m^3$, 0.01 $m^3$, 0.025 $m^3$, 0.05 $m^3$, 0.1 $m^3$, 0.5 $m^3$, 1 $m^3$, 2 $m^3$, 2.5 $m^3$, 3 $m^3$, 4 $m^3$, 5 $m^3$, 10 $m^3$.

According to certain embodiments, a plastic liner may be used. In certain embodiments such a plastic liner may comprise a thermoset material.

In some embodiments, a plastic liner may comprise a thermoplastic material. Such a thermoplastic material may allow welding or a heat sealing process to join two separate workpieces at their interface.

In some embodiments the liner may be formed from a plastic material having a desirable combination of one or more characteristics. An example of a desirable characteristic for a liner material is low flammability at the high gas pressures expected within the unit. For example, compressed air at 3000 psi (207 bar) and 4350 psi (300 bar) is classed as an enriched oxygen-rich environment, because the partial pressure of the oxygen exceeds a threshold value of 27.5 kPa. Thus the material for the liner may be chosen so as not be flammable under these conditions.

Examples of other potentially desirable characteristics may include but are not limited to thermal properties allowing fabrication of the liner, and weldability. One specific possible candidate plastic material exhibiting a desirable combination of properties is high density polyethylene (HDPE).

Figure 7:
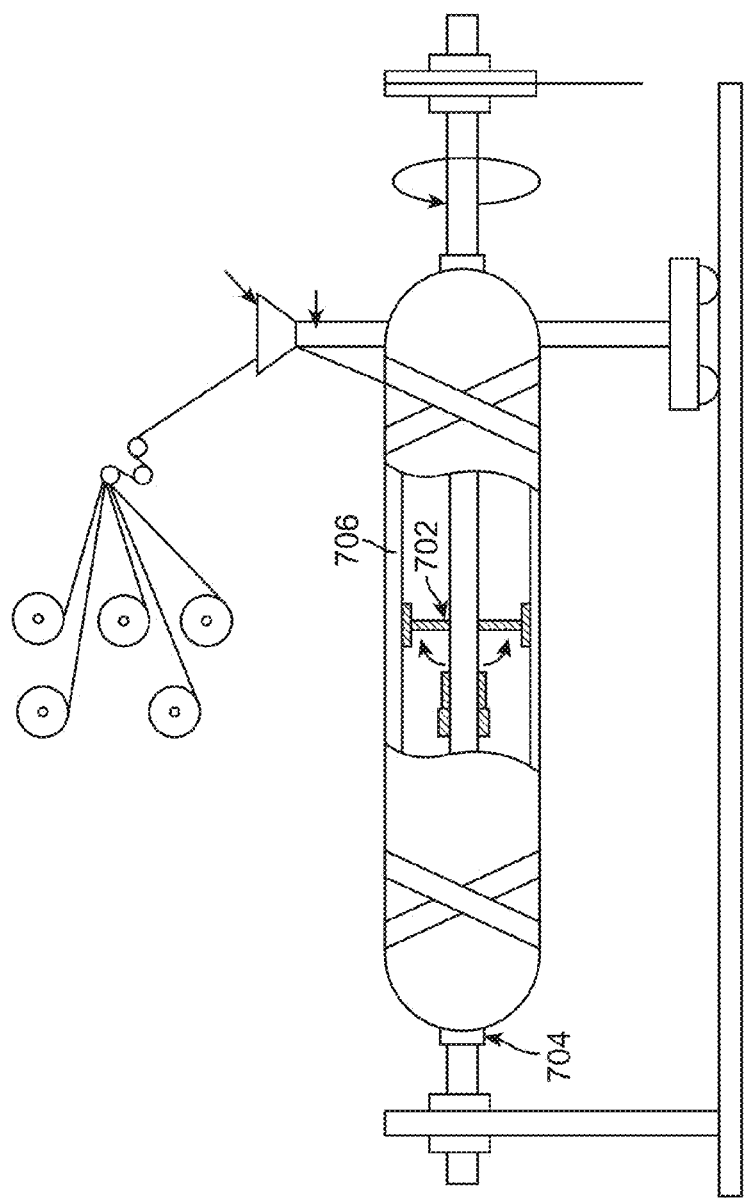
FIG. 7 shows an embodiment of a liner having a collapsible stiffener disposed therein during a filament winding fabrication process.

In certain embodiments, the liner may form part or all of the rotatable mandrel about which the fiber is wound. In cases involving compressed gas storage units of significant length, longitudinal fibers can be molded into the liner or applied to the outer diameter of the liner in order to prevent sagging of the liner/mandrel during the winding process, and/or the liner could be reinforced by the insertion of a collapsible stiffener. As shown in FIG. 7, this collapsible stiffener 702 could be collapsed to be inserted through the opening 704 in the liner 706, and then expanded to contact the sides of the liner and provide physical support. Following the winding and curing process, the stiffener could be collapsed and retracted from inside the liner, whose continued stiffness is now ensured by the presence of the wound filament.

The composition and structure of internal components such as liners, resins, and fibers, can affect the performance of a gas storage unit. The expense of such a storage unit can be reduced by allocating higher-cost materials to key roles, while allocating lower-cost materials to other roles. Thus according to various embodiments, a compressed gas storage unit may exhibit a heterogeneous structure comprising more than just the liner and a single type of fiber winding.

Appropriate fibers may be evaluated and implemented to reduce cost. Examples of such fibers include large tow, commercial grade carbon as described above. Such fiber offers high strength (4 to 5× higher than SAE 4340 steel), and light weight (35% lighter than aluminum, 80% lighter than steel).

Wound filaments may also comprise polymer material. In the fiber form, UHMWPE has a maximum tensile strength of about 435,000 psi. By contrast, in the solid form the tensile strength of UHMWPE is about two orders of magnitude lower, or 4000 psi. Calculation of the wall thickness as t=Pr/S, (P=internal pressure, r=radius, S=strength) indicates the relationship as being inversely linear. Accordingly, a tank wall of UHM WPE can be 100 times thinner if the fiber form is used instead of solid plastic.

Other candidates for fiber materials include basalt, fiberglass, and Kevlar. Such fibers may offer high strength (3× higher than SAE 4340 steel) and light weight (similar to aluminum, 65% less than steel) at relatively low cost. However, the stress-strain response of such fibers is highly non-linear, and the ASME codes may require higher safety factors (3.5) for these fibers than for carbon (2.4), potentially increasing cost.

Still another candidate for a fiber material is steel wire. The use of steel wire as a wound filament in a pressure vessel is described in detail in U.S. patent application Ser. No. 13/050,442, filed Mar. 17, 2011 and incorporated by reference in its entirety herein for all purposes. While offering the potential benefit of low cost fiber, embodiments utilizing a wound steel wire may not covered by existing codes, potentially affecting development costs.

Figure 9:
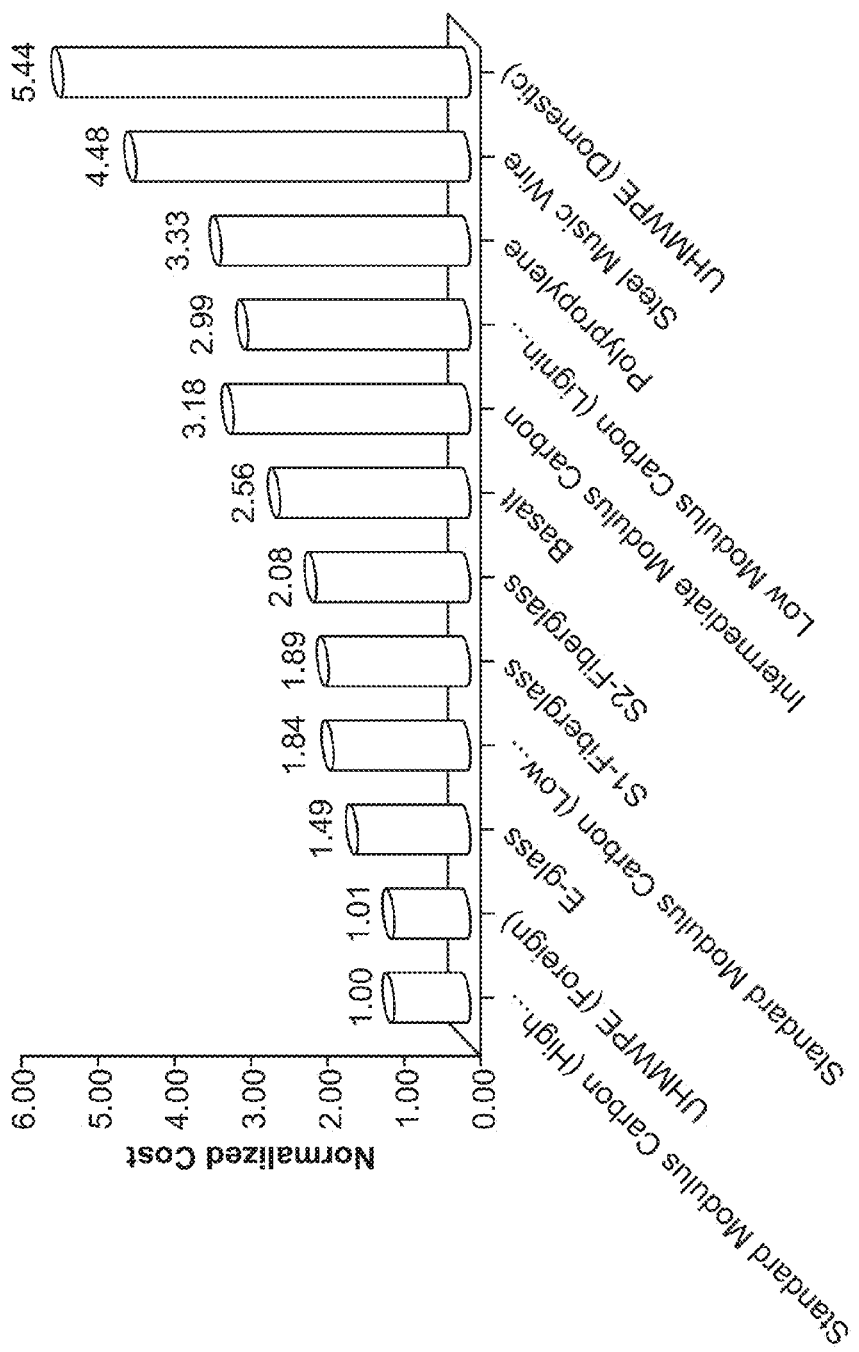
FIG. 9 is a table showing characteristics of the fiber types of FIG. 8.
Figure 26:
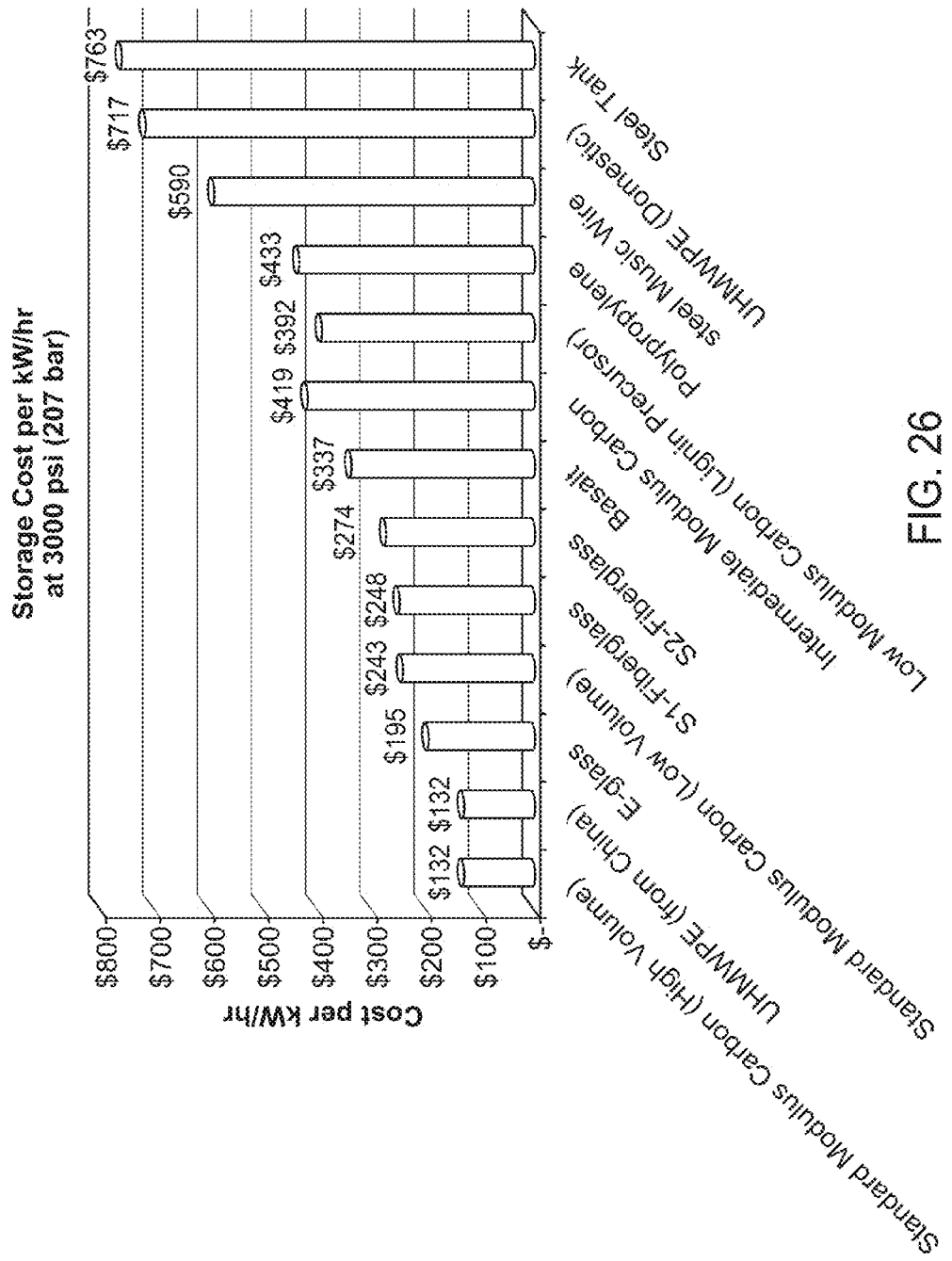
FIG. 26 plots a cost per kWhr for compressed gas storage units fabricated from various materials.

The following equation provides a Figure of Merit (FOM) as a measure to assess relative costs of filament-wound compressed gas storage units made from various materials, with a lower FOM representing a lower cost solution:

$$FOM = \left(\frac{SF}{\sigma_f}\right)\left[\$_f + \$_r\left(\frac{1-v_f}{v_f}\right)\left(\frac{\rho_r}{\rho_f}\right)\right],$$

where:
SF=Safety Factor
$\bar{\sigma}$=Specific Strength of fiber
$\$_f$=Unit Price of Fiber
$\$_r$=Unit Price of Resin
$v_f$=Fiber Volume Fraction
$\rho_r$=Resin Density
$\rho_f$=Fiber Density FIG. 8 shows the results of applying the FOM to a number of different fiber types having the characteristics shown in FIG. 9, to a filament wound structure having the same dimensions. The results in FIG. 9 are based upon an assumption of a fiber volume fraction of 0.6 and a unit price of resin of 2.55 ($/lb). FIG. 26 shows a list of actual costs (in $/kWhr) of various materials, with a steel tank included for reference.

While the above figures have shown the fabrication of compressed gas storage tanks by blow molding or fiber winding, these processes are not exclusive. A compressed gas storage unit according to some embodiments may feature a gas tight internal plastic liner formed by blow molding, reinforced to resist high internal pressures by filament winding.

Some embodiments may allow a reduction in the required safety factor, where a strength of the blow molded liner allows it to share a part of the load. In certain embodiments the blow molded liner may be formed utilizing a filament wound structure as a mold. According to some embodiments, a stiffness/strength of a blow-molded liner may facilitate its use as a mandrel in a filament winding process.

According to still other embodiments, a liner may be molded utilizing other techniques inside a filament-wound or other type of pressure vessel that functions as the primary load-bearing structure. For example some embodiments could employ a rotational molding approach rather than blow-molding. The liner could serve as sealing element to prevent leakage.

Embodiments of gas storage units could be provided with a "leak before burst" (LBB) safety feature in order to avoid explosion in the event that a tank were to become overpressurized. In one such embodiment, the LBB feature could be that a molded plastic liner includes a safety feature to ensure that the liner will leak at a pressure lower than the burst pressure of a composite overwrap. According to alternative embodiments, an LBB feature could be imparted by assembling a molded plastic liner by joining two or more pieces in such a way that the joint between them will leak at a pressure lower than a burst pressure of a composite overwrap.

Whether fabricated by blow molding, rotational molding, filament winding, and/or other techniques, embodiments of compressed gas storage units according to the present invention may be bundled to form larger modules exhibiting desirable characteristics. One example of such a characteristic is size, where the individual compressed gas storage units may be assembled into a module that is sized to fit on a flatbed trailer of a standard tractor-trailer rig. Other examples of possible form factors include the size of a standard enclosed trailer of a tractor-trailer, the size of a standard railroad box car, the size of a standard railroad flatbed car, or the size of a standard shipping container.

Still another possible characteristic of a compressed gas storage module is capacity. In particular, in some embodiments a module may be configured to contain a sufficient amount of compressed gas to deliver a standard increment of power (e.g. 1 MWh of power). The highest pressure of the gas contained within the storage unit could be 200 bar, 300 bar, or even higher depending on the embodiment.

For example, at 300 bar, about 30 liters of compressed gas storage may be needed per kWh. At 200 bar, 50 l/kWhr may be needed. Thus a compressed gas storage module having a capacity of 1 MWh of storage may utilize a minimum volume of 40 m$^3$.

Figure 10:
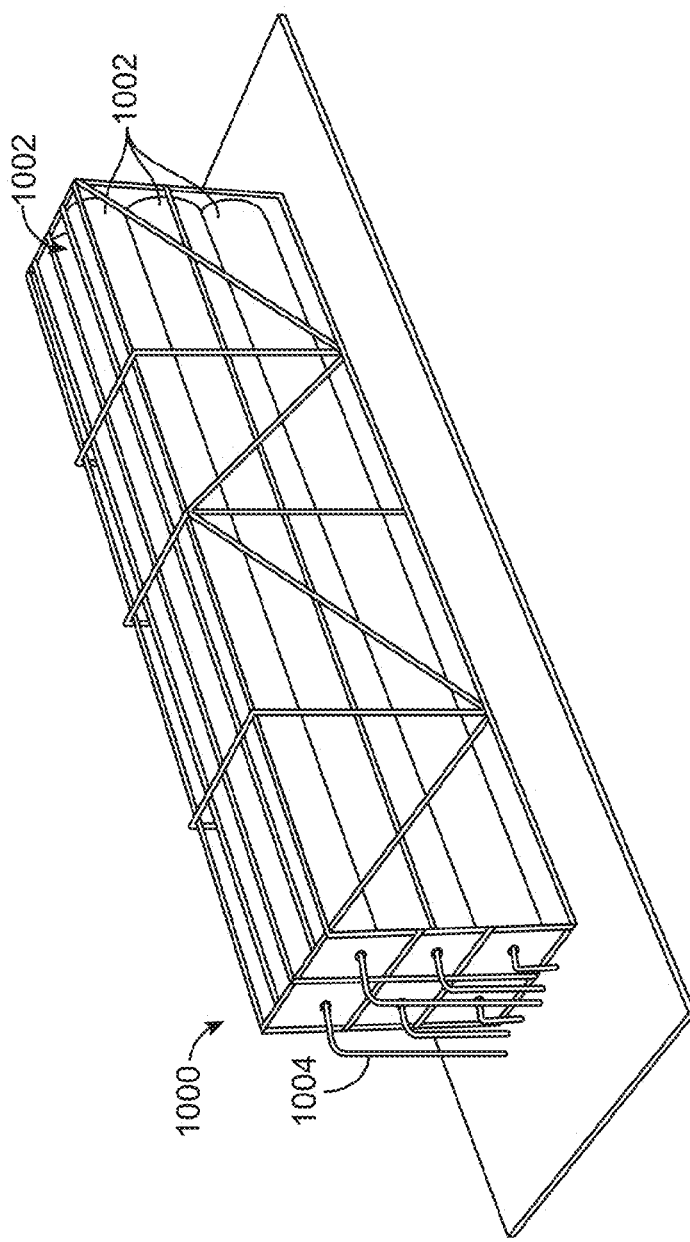
FIG. 10 shows an embodiment of a compressed gas storage module.

FIG. 10 shows an embodiment of a compressed gas storage module. Module 1000 contains six (6) individual storage units 1002 having a cylindrical shape. Each storage unit may have an internal volume of about 2 m$^3$ and an air storage pressure of about 200 bar (~3000 psi). The dimensions of the storage units are approximately 45" diameter, and less than 48' long. The individual storage units may be in selective fluid communication through external piping 1004.

According to certain embodiments, the end fixtures of cylindrically-shaped storage units could include features such as flanges and/or threads to facilitate connection with another storage unit, thereby allowing storage capacity to be expanded or reduced in a modular manner. In certain embodiments the connections between successive storage units could have a particular shape, to allow arrangement of the tanks in compact serpentine or folded configurations.

Figure 29A:
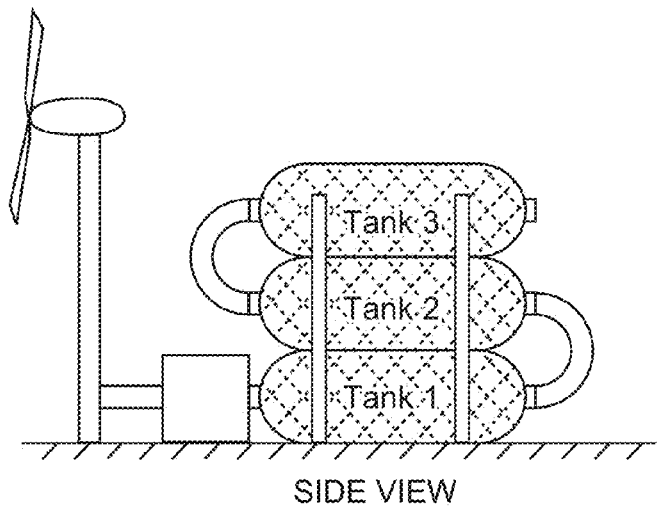
FIG. 29A shows a side elevational view of a configuration utilizing a vertical folded configuration for pressure vessels.
Figure 29B:
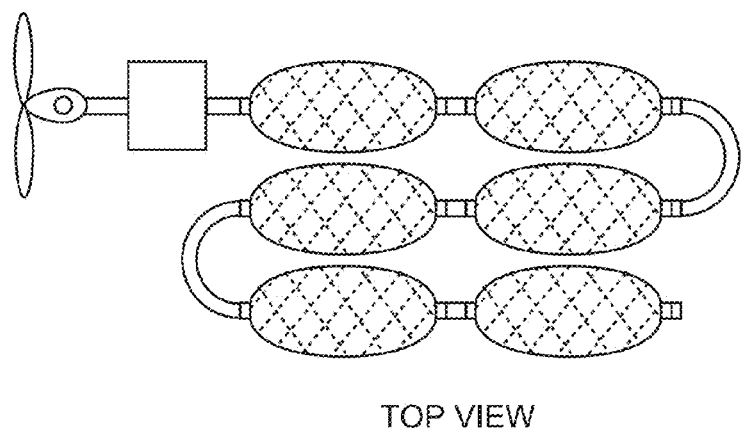
FIG. 29B shows a plan view of a configuration utilizing a serpentine horizontal folded configuration for pressure vessels.

For example, FIG. 29A shows a side elevational view of a configuration utilizing a vertical folded configuration for pressure vessels. FIG. 29B shows a plan view of a configuration utilizing a serpentine horizontal folded configuration. Such configurations may employ elbow-type conduits. As used herein the term elbow is not limited to a shape exhibiting any particular angle (such as 90°), but instead encompasses a conduit whose main axis experiences a change in direction along its length.

Elbow-type conduits themselves may also be fabricated utilizing bulk material (such as steel or another metal), or may be fabricated utilizing composite materials such as filament-wound designs. Examples of elbow-type conduits utilizing filament winding principles, are described by Li and Liang in "Computer aided filament winding for elbows", J. Software, Vol. 13(4), pp. 518-25 (2002), which is incorporated by reference in its entirety herein for all purposes.

Figure 11:
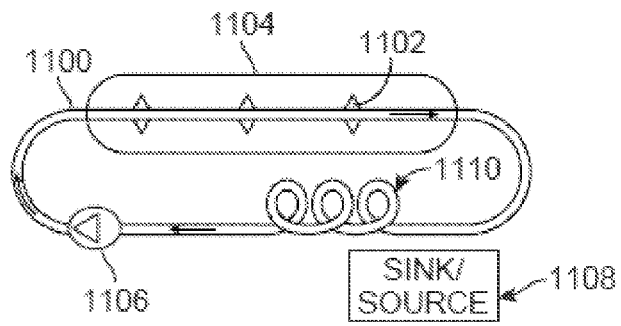
FIG. 11 shows an embodiment of a compressed gas storage unit including a heat exchanger.

Whether fabricated by blow molding, filament winding, and/or other techniques, embodiments of compressed gas storage units may be configured to include elements to perform heat exchange with the compressed gas. FIG. 11 shows one embodiment, wherein heat exchange element 1100 comprising fins 1102, extends inside the storage unit 1104.

A heat exchange fluid is flowed through the heat exchange element 1100 by circulator 1106. In certain embodiments, the heat exchange fluid may be a liquid, such as water. In some embodiments the heat exchange fluid may be a gas, such as helium. In particular embodiments, the heat exchange fluid may undergo a phase change between the liquid and gas.

The circulated heat exchange fluid is in thermal communication with an external heat source/heat sink 1108 through a heat exchanger 1110 in order to receive/dissipate thermal energy. For example, where compressed gas is being flowed into the unit for storage, the heat exchanger may be placed into thermal communication with a heat sink. Where compressed gas is being flowed out of the unit, the heat exchanger may be placed into thermal communication with a heat source.

Figure 11A:
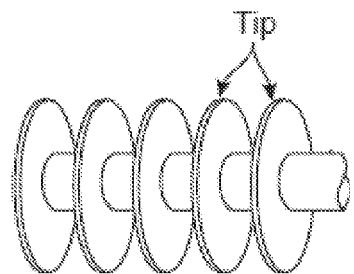
FIGS. 11AA-AB show perspective and cross-sectional views of another embodiment of a compressed gas storage unit including an internal heat exchange element.
Figure 11A:
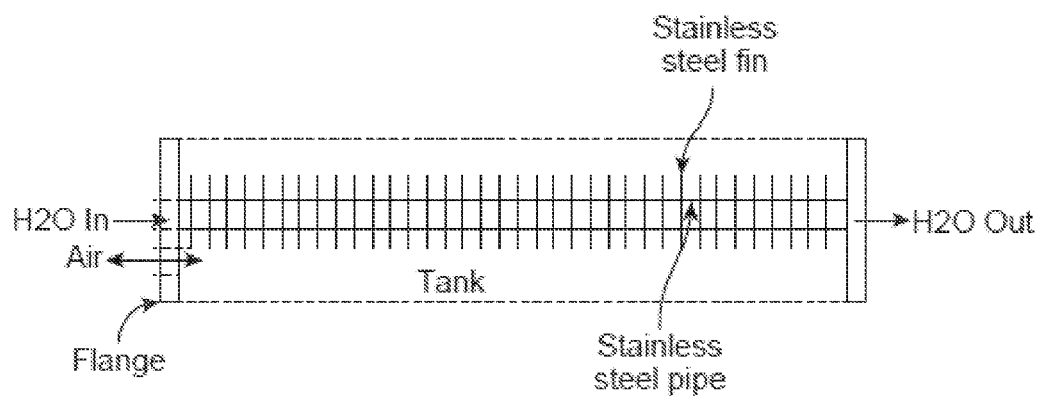

FIGS. 11AA-AB show perspective and cross-sectional views of another embodiment of a compressed gas storage unit including an internal heat exchange element. This particular embodiment comprises a plurality of circular fins oriented orthogonal to the central tube through which the exchange fluid flows. One or more portions of an internal heat exchange element may be constructed from corrosion-resistant material, of which stainless steel represents only one particular example. According to some embodiments, an internal heat exchange structure (e.g. a finned tube) may also function to provide longitudinal support and prevent sagging of a mandrel (which can be a liner) during winding.

A heat source may be naturally-occurring (e.g. solar radiation, geothermal) or artificial (e.g. the result of an industrial process, power generation, energy storage, or other human activity). A heat sink may be naturally-occurring (e.g. an existing body of water such as a lake or the ocean, or an environmental temperature) or artificial (e.g. a cooling tower).

Certain embodiments may comprise one or more heat pipe structures to aid in the efficient transmittal of thermal energy to/from the compressed gas present within the storage unit. Such heat pipe structures may rely upon a phase change of a heat exchange fluid circulated for selective exposure to a heat source and/or heat sink. The heat exchange fluid may be actively circulated (e.g. by a pump and/or fan), or may be passively circulated (e.g. by capillary and/or gravitational action) in whole or in part.

Figure 12:
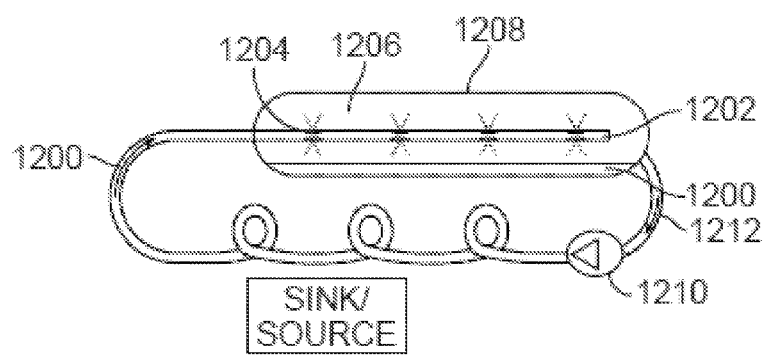
FIG. 12 shows an alternative embodiment of a compressed gas storage unit including a heat exchanger.

In some embodiments, heat exchange may involve the introduction of a liquid directly into the compressed gas storage unit for heat exchange with the compressed gas. One such embodiment is shown in FIG. 12, where circulating liquid 1200 flowed through central pipe 1202 is sprayed through openings 1204 into the interior 1206 of the storage unit 1208 for heat exchange, and then is drawn for circulation by pump 1210 through drain 1212.

According to certain embodiments, liquid water may be sprayed as a heat exchange medium. In some embodiments, liquid nitrogen may be sprayed as a heat exchange medium. Such an embodiment may offer benefits in that liquid nitrogen is very cold and could also serve to inert compressed air by reducing its oxygen content, for improved safety.

Figure 13:
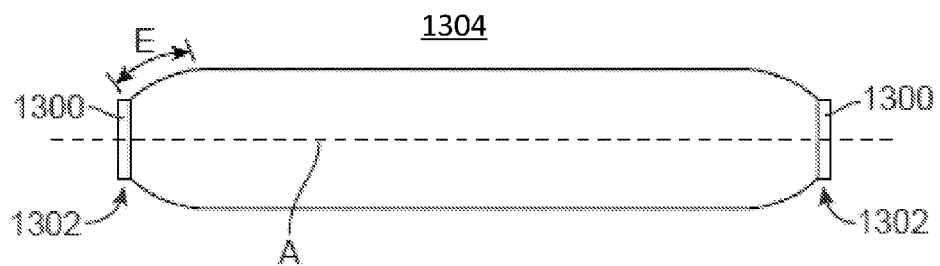
FIG. 13 shows an embodiment of a compressed gas storage unit having polar end pieces and oriented along an axis.

The compressed gas storage unit may be specifically designed to accommodate a heat exchanger structure. For example, as shown in FIG. 13 end pieces 1300 located at poles 1302 of a storage unit 1304 oriented along axis A, may be of a larger size to accommodate insertion of the heat exchanger. Such a configuration may offer the additional benefit of facilitating construction by reducing the extent E of curved surfaces located at the poles that may be difficult to effectively cover utilizing conventional filament winding geometries.

Figure 14:
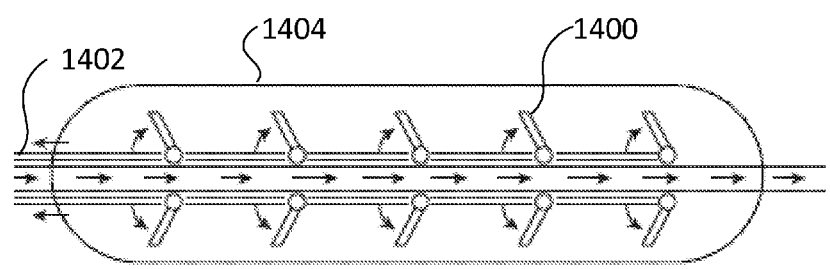
FIG. 14 shows an embodiment of a compressed gas storage unit having an expandable heat exchanger present therein.

Moreover, in some embodiments the heat exchanger may change shape once positioned within the interior of the storage unit. For example, as shown in FIG. 14, projections 1400 (for example serving as fins) of the heat exchange element 1402 may unfold once positioned inside the compressed gas storage unit 1404, under the influence of mechanical action. Alternative embodiments could rely upon other forces to accomplish such a shape change, for example pressure of a flowed heat exchange fluid.

While it may be desirable for the heat exchanger to also be collapsible allowing removal from the compressed gas storage unit for periodic inspection, maintenance, and/or replacement, this is not required in all embodiments. Moreover, in certain embodiments a shape changing structure could serve more than one purpose, for example providing support during fabrication (similar to FIG. 7), and then remaining in the completed structure so as to perform a heat exchange function.

According to certain embodiments, a liner of a compressed gas storage unit may perform a heat exchange function. For example the liner may comprise a thermally conducting material (e.g. a metal such as aluminum or thermally conductive polymer), which depending upon its thickness may or may not also serve a load-sharing function.

Thermal energy could be communicated passively or actively to and from compressed gas within the storage unit via the liner, for example utilizing a heat exchange medium comprising a liquid, solid, and/or gas. The thermal energy could communicate with the liner through walls of the storage unit, through a port, and/or through members extending through the walls.

Figure 15:
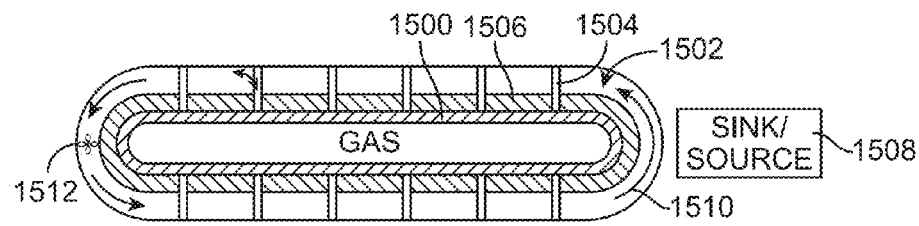
FIGS. 15-18 show embodiments of compressed gas storage units employing a liner for heat exchange.

FIG. 15 shows a particular embodiment wherein thermal energy may be communicated to liner 1500 of compressed gas storage unit 1502 via members 1504 extending through walls 1506. Members 1504 may be solid or may exhibit a more complex structure (e.g. perforated, hollow, sealed heat pipe), and may be in selective communication with a heat sink and/or heat source 1508 utilizing heat exchange fluid 1510 (e.g. gas, liquid, phase changing material). In this particular embodiment the heat exchange fluid may be actively flowed by circulator 1512 (e.g. fan or pump), but in other embodiments may flow passively wholly or in part (e.g. by mechanisms such as convection, conduction, and/or radiation).

Figure 16:
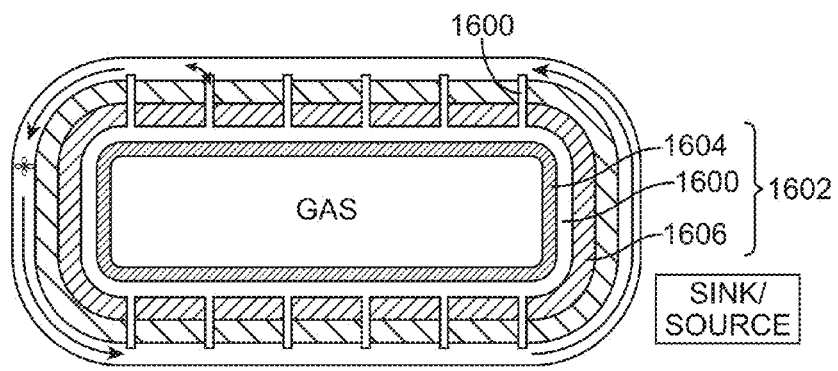

According to certain embodiments, the liner itself may comprise multiple elements. For example, in the particular embodiment of FIG. 16, tubing 1600 (which may be solid or hollow) comprising aluminum (or another thermally conductive material) could comprise a middle component of a sandwich 1602 comprising an inner liner 1604, the tubing, and an outer liner 1606.

According to some embodiments, a liner could be fabricated with coolant channels built in. For example, in particular embodiments a liner could be fabricated from a plurality of blow molded shells having an intervening heat exchange medium present therebetween.

Figure 17:
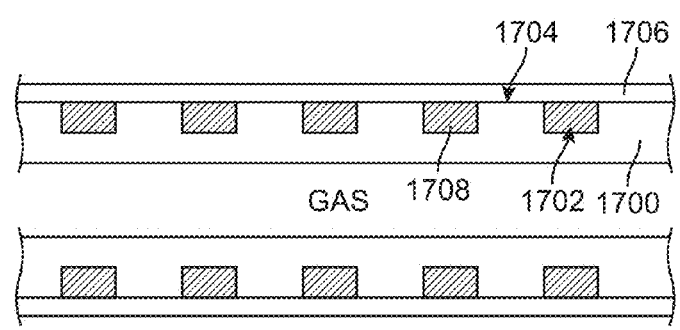

FIG. 17 shows an embodiment of a liner 1700 cast with channels 1702 in the outside surface 1704, and then covered with a skin 1706 that seals the channels to retain a heat exchange medium 1708. Such channels could assume many configurations, including circumferential, longitudinal, spiral, interconnected, or any combination thereof.

Figure 18:
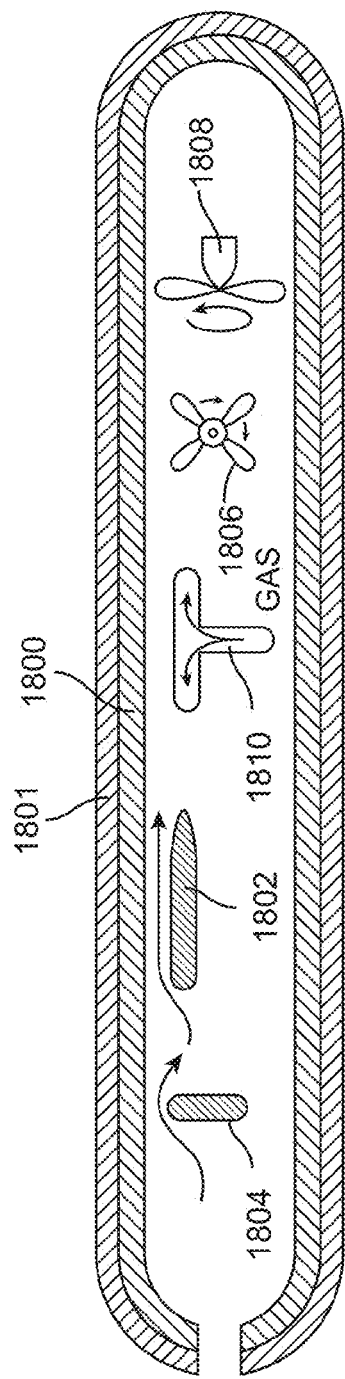

To aid in the heat exchange function, certain embodiments could include additional elements configured to promote thermal interaction between a liner and compressed gas within the storage unit. As shown in FIG. 18, such elements could operate in a passive or active manner to enhance thermal interaction with a liner 1800 enclosed within a wall 1801 of a compressed gas storage unit. Examples of such structures may include but are not limited to airfoils 1802, baffles 1804, turbines 1806, fans 1808, or heat pipes 1810.

Example

An embodiment of a design for a compressed gas storage unit employs a fully overwrapped pressure vessel made from standard modulus, large tow carbon fiber in an epoxy matrix. The storage unit includes a polymer liner with an embedded metal fitting at each pole. An axisymmetric slice of the full-scale tank is shown in FIG. 19, and a detailed view of the port and dome region is shown in FIG. 20.

The length of the cylindrical portion of the tank is 40 feet, measured between the dome tangency points. An isotensoid geodesic dome contour was used. The isotensoid contour may be preferred over hemispherical or semi-elliptical shapes for filament wound tanks, because it may provide uniform tensile stresses in the helical fiber at all points on the fiber path of the dome. The isotensoid contour may also be more spatially efficient than a hemispherical dome. The height of the each dome is approximately 13 inches.

A liner thickness of about 0.25 inches can be optimized. An embedded metal fitting with a polar opening was used in the preliminary design. The diameter of the fitting is large enough to prevent the fitting from shearing thru the composite, while the port openings and flanges are consistent with a standard flanged pressure fitting. The fitting contour may be optimized. Port openings were used at both ends of the tank.

The friction angle parameter for a wet-wound composite structure defines an upper bound for the orientation of helical fibers to ensure that they do not slip off the dome during the winding process. If the wind angle exceeds the friction angle, friction is required to ensure that the fibers are stable. While the friction angle may be exceeded in tow-pregnated vessels, this parameter can cause problems with a slippery resin-coated fiber.

The friction angle on an isotensoid dome can be determined geometrically as the arcsine of the ratio of port and cylinder openings. The effective port radius on the baseline liner may be 2.99 inches, while the inner diameter of the cylinder section was 19 inches. Accordingly, the calculated helical angle for the baseline tank was 9.06 degrees. The following table contains a summary of the composite layup and ply stacking sequence for a baseline tank.

| Orientation | Number of plies | Thickness | Angle |
| --- | --- | --- | --- |
| Hoop | 2 | 0.0532 | 89.25 |
| Helical | 1 pair (+/−) | 0.0528 | +/−9.06 |
| Hoop | 2 | 0.0532 | 89.25 |
| Helical | 1 pair (+/−) | 0.0528 | +/−9.06 |
| Hoop | 2 | 0.0532 | 89.25 |
| Helical | 1 pair (+/−) | 0.0528 | +/−9.06 |
| Hoop | 2 | 0.0532 | 89.25 |
| Helical | 1 pair (+/−) | 0.0528 | +/−9.06 |
| Hoop | 2 | 0.0532 | 89.25 |
| Helical | 1 pair (+/−) | 0.0528 | +/−9.06 |

Preliminary analysis of the baseline tank design was completed to verify the structural integrity during operating conditions. Finite element analysis of the 3000 psi pressure load was completed using MSC NASTRAN, and results showed that positive margins of safety will be maintained for a composite tank with a 1.01 inch thick wall.

Figure 21:
Figure 22:
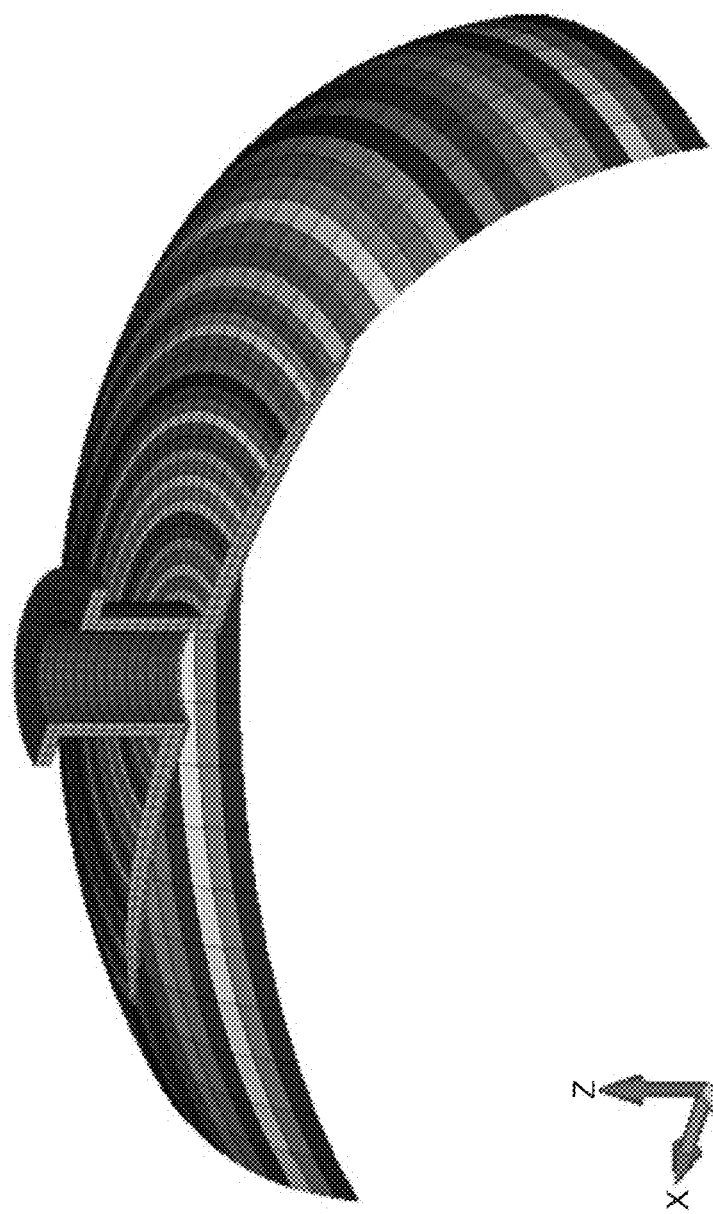

Half of the tank was modeled, and symmetry conditions were applied at its midpoint. The model used 12,736 nodes and 15,552 shell elements. 43 different layups were represented as 2D laminate elements using PCOMP cards in NASTRAN. Solid elements were used to model the metal fittings. FIG. 21 shows the finite element model of half the tank, and FIG. 22 provides a closer view of the model in the area of the dome and metal fitting.

Data for fiber and resin was used to calculate composite properties for the hoop and helical plies using micromechanics and assuming a square packing array. A fiber volume fraction of 0.61 was used for the hoops, and 0.55 was used for the helicals. The following table 4 summarizes datasheet and assumed properties for Zoltek Panex 35 fiber.

| Fiber Property | Value | Unit | Notes |
| --- | --- | --- | --- |
| Density | 0.0654 | Lb/in$^3$ | Zoltek data sheet |
| Modulus $E_1$ | 35,100 | Ksi | Zoltek data sheet |
| Tensile Strength | 600 | Ksi | Zoltek data sheet |
| Poisson ratio $v_{12}$ | 0.2 | — | From T300 3K Fiber data |
| Tensile Modulus $E_2$, $E_3$ | 2340 | Ksi | From ratio of $E_1/E_2$ for T300 |
| Shear Modulus $G_{12}$, $G_{13}$ | 4250 | Ksi | From ratio of $E_1/G_{12}$ for T300 |
| Shear Modulus $G_{23}$ | 1060 | Ksi | From ratio of $G_{12}/G_{23}$ for T300 |

The following table contains data for 3M Resin 4831.

| Resin Property | Value | Unit | Notes |
| --- | --- | --- | --- |
| Density | 0.051 | Lb/in$^3$ | 3M data sheet |
| Tensile Modulus | 722 | Ksi | 3M data sheet |
| Shear Modulus | 268 | Ksi | 3M data sheet |
| Tensile Strength | 12.8 | Ksi | 3M data sheet |
| Poisson Ratio $v_{12}$ | 0.347 | — | 3M data sheet |
| Compressive Strength | 19.2 | Ksi | Estimated |
| Shear Strength | 9.5 | Ksi | Estimated |

The calculated input properties for the hoop plies are provided in the following table.

| Calculated Property | Value | Unit | Notes |
| --- | --- | --- | --- |
| Density | 0.0598 | Lb/in$^3$ | Calculated using Chamis |
| Tensile Modulus $E_1$ | 21,700 | Ksi | micromechanics model in |
| Tensile Modulus $E_2$, $E_3$ | 1540 | Ksi | ABAQUS with square |
| Poisson Ratio $v_{12}$, $v_{13}$ | 0.252 | | packing array and 61% |
| Poisson Ratio $v_{23}$ | 0.451 | | fiber volume fraction. |
| Shear Modulus $G_1$, $G_2$ | 19.2 | Ksi | |
| Shear Modulus $G_3$ | 9.5 | Ksi | |
| Tensile Strength-1 dir | 371 | Ksi | |
| Compressive Strength-1 dir | 295 | Ksi | From ratio of T300 at 60% FVF |
| Tensile Strength-2 dir | 11.3 | Ksi | |
| Compressive Strength-2 dir | 37.6 | Ksi | |
| Shear Strength | 6.6 | Ksi | |
| Interlaminar Shear Strength | 11.3 | Ksi | |

Calculated properties for the helical plies are in the following table.

| Calculated Property | Value | Unit | Notes |
| --- | --- | --- | --- |
| Density | 0.0589 | Lb/in$^3$ | Calculated using Chamis |
| Tensile Modulus $E_1$ | 19600 | Ksi | micromechanics model in |
| Tensile Modulus $E_2$, $E_3$ | 1440 | Ksi | ABAQUS with square |
| Poisson Ratio $v_{12}$, $v_{13}$ | 0.455 | | packing array and 55% |
| Poisson Ratio $v_{23}$ | 0.387 | | fiber volume fraction. |
| Shear Modulus $G_1$, $G_2$ | 794 | Ksi | |
| Shear Modulus $G_3$ | 435 | Ksi | |
| Tensile Strength-1 dir | 335 | Ksi | |
| Compressive Strength-1 dir | 267 | Ksi | From ratio of T300 at 55% FVF |
| Tensile Strength-2 dir | 11.1 | Ksi | |
| Compressive Strength-2 dir | 39 | Ksi | |
| Shear Strength | 7.5 | Ksi | |
| Interlaminar Shear Strength | 11.1 | Ksi | |

Loads and boundary conditions were determined as follows. An internal pressure load of 3000 psi was the only external load applied to the model. Symmetry boundary conditions were imposed along the mid-plane of the cylinder, since only half of the tank was modeled.

Analysis showed that positive margins of safety were maintained throughout the tanks, although stress concentrations were observed in two transition areas. Ply-by-ply failure indices were computed using a design safety factor of 2.25. A failure index of 1.0 represents a margin of safety of 0.0. If the index is greater than 1.0, the margin is negative. Failure indices less than 1.0 represent positive margins of safety.

In the cylinder portion of the tank, the failure index for the hoop fibers was 0.99, occurring in the inner-most hoop fiber. The failure index for the helicals was 0.62. Failure indices that exceeded 1.0 occurred in two transition areas, denoting stress concentrations in those locations. The first of these hot spots occurred in the helical fibers of the dome at the outermost edge of the metal fitting. The second area of concern was the tangency area at the intersection of the dome and the cylinder. These locations can be addressed by further minor design modifications.

At the edge of the metal fitting, changes to the shape of the fitting should be able to ensure a smoother transition to minimize (or eliminate) stress peaks in that area. If not, local reinforcement such as doilies may be required. In the tangency areas, the locations of ply drops for the hoops can be adjusted to smooth out the stress peaks.

Figure 23:
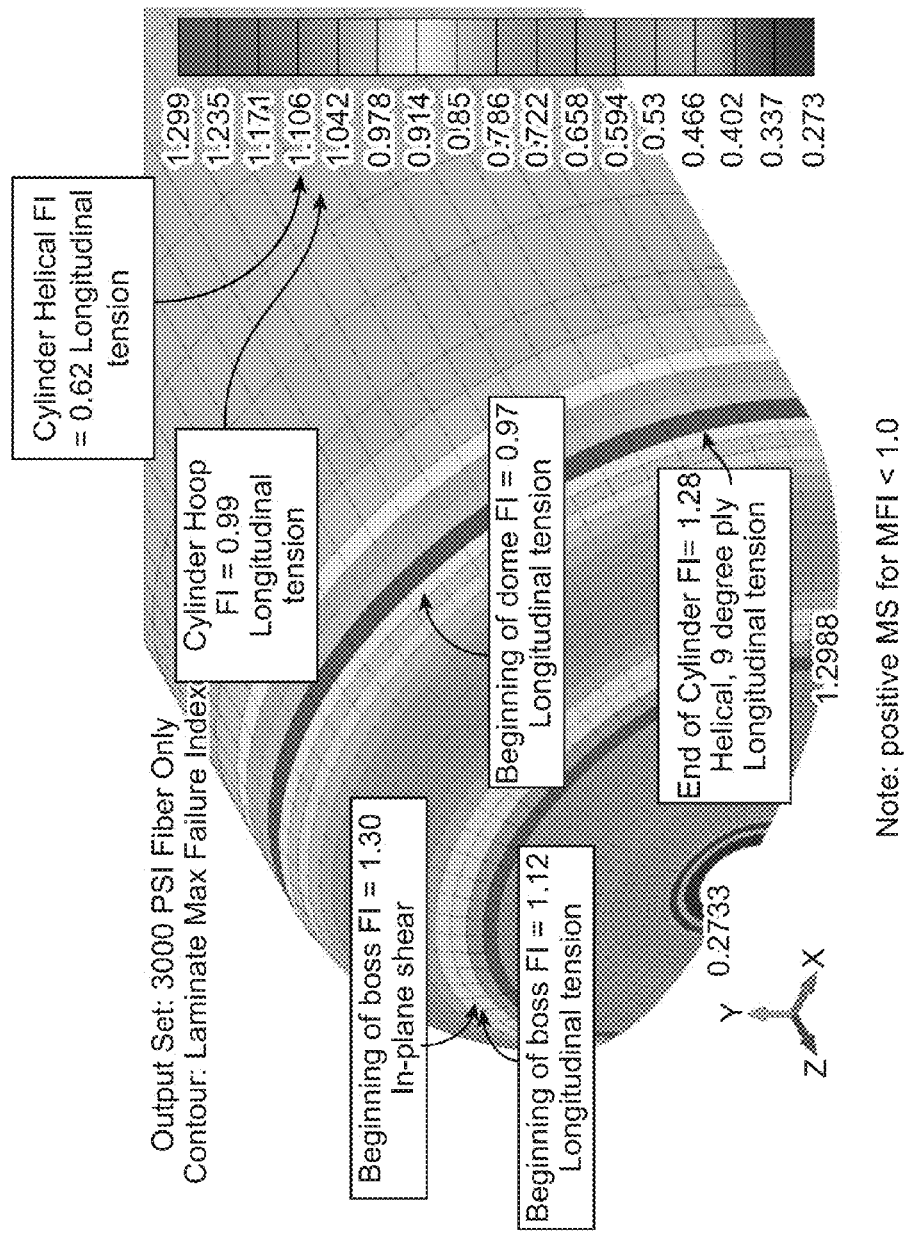
Figure 24:
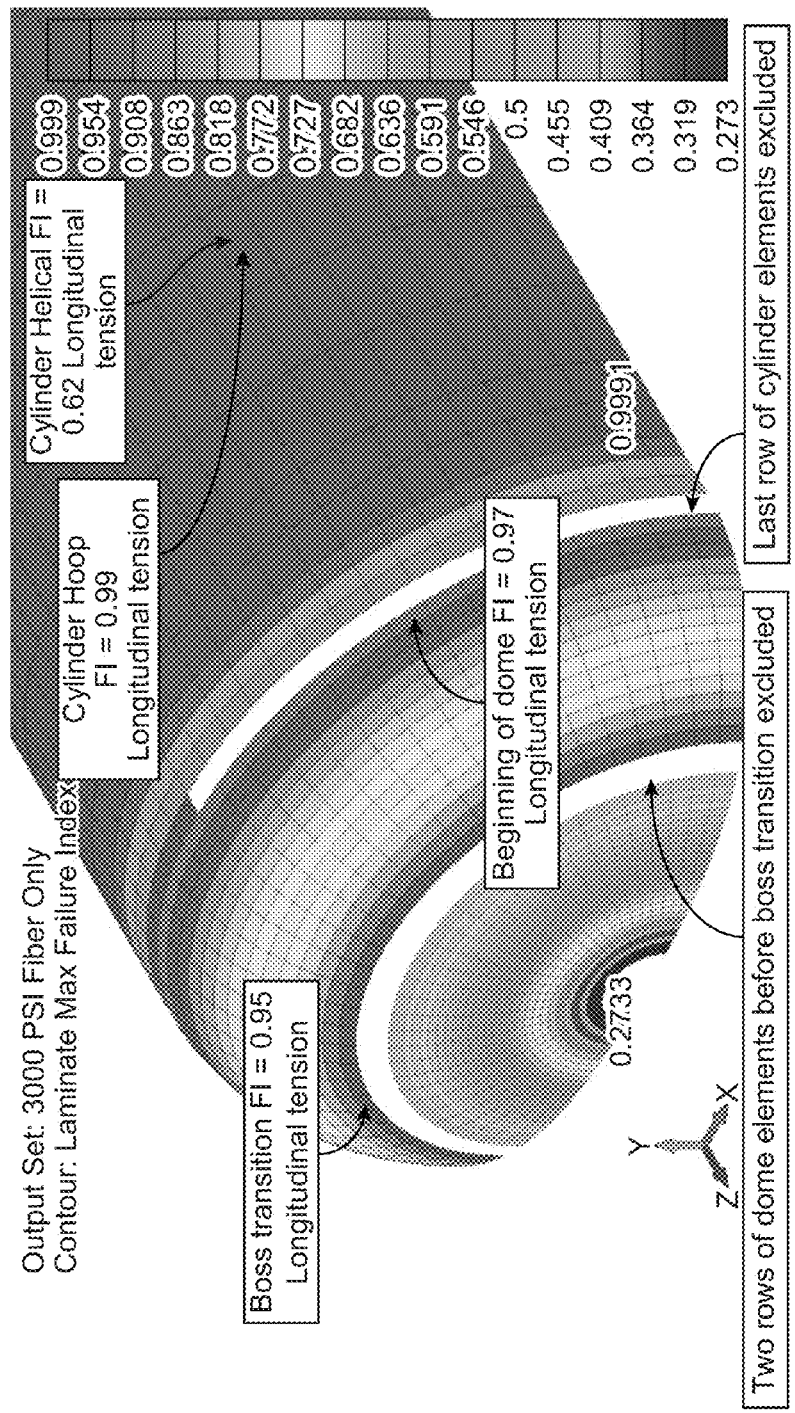

FIG. 23 shows a plot of failure indices in the full model of the tank due to the 3000 psi pressure load, while FIG. 24 shows the same plot with peaks omitted in order to provide a more representative contour plot for visualization.

Figure 25:
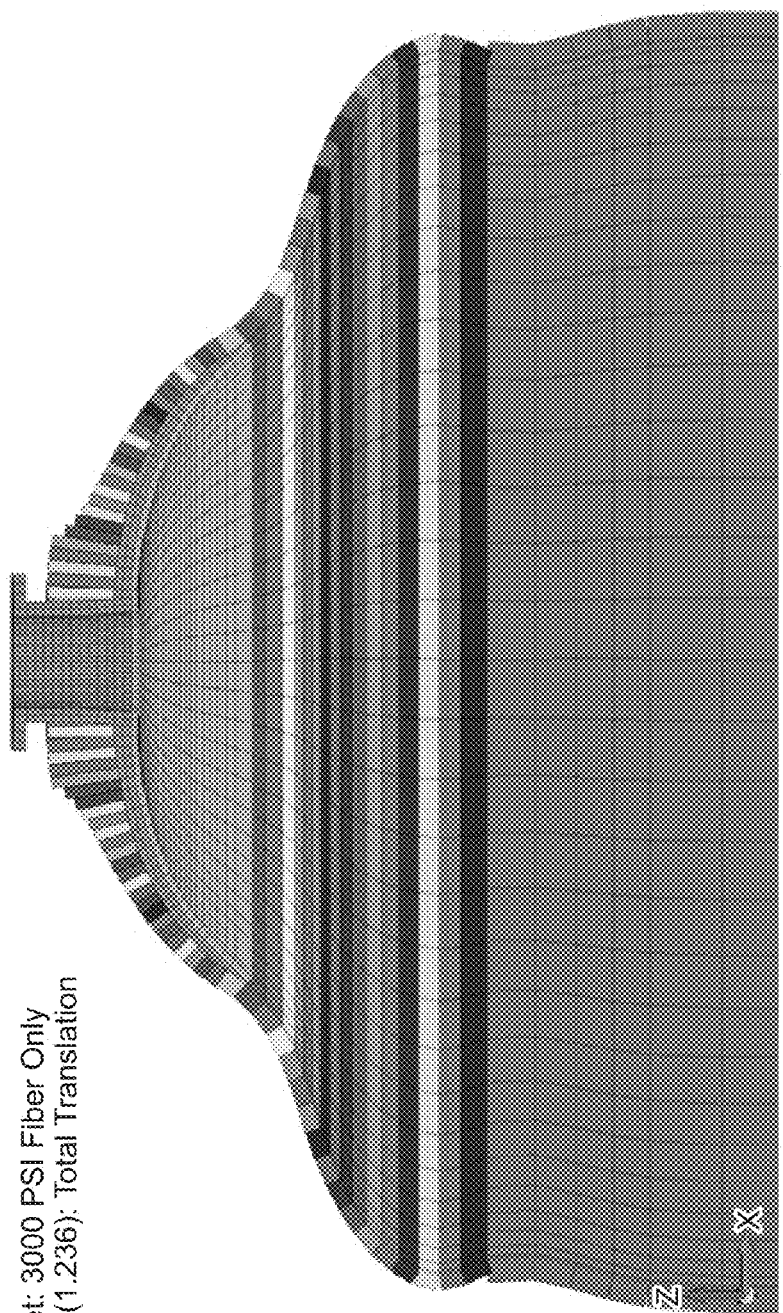

FIG. 25 shows a magnified plot of deformation in the dome under pressure. Stresses at the edge of the metal fitting can be reduced by modification of the fitting design to reduce the inflection points that occur when the dome is pressurized.

22. A compressed gas storage unit comprising:
 a molded plastic liner defining an internal chamber; and
 a wound filament in contact with the molded plastic liner.

23. A compressed gas storage unit as in clause 22 wherein the molded plastic liner comprises a blow molded shell.

24. A compressed gas storage unit as in any of the previous clauses wherein the molded plastic liner is molded within the wound filament.

25. A compressed gas storage unit as in any of the previous clauses wherein the molded plastic liner is rotary molded.

26. An apparatus comprising:
 a compressed gas storage unit defining an internal chamber; and
 a heat exchanger disposed in the internal chamber to communicate heat to and from stored compressed gas.

27. An apparatus as in clause 26 wherein the heat exchanger comprises a circulating heat exchange fluid.

28. An apparatus as in any of the previous clauses wherein the heat exchanger comprises a heat pipe.

29. An apparatus as in any of the previous clauses wherein the circulating heat exchange fluid is thermal communication with a heat source and/or heat sink through an external heat exchanger.

30. An apparatus as in any of the previous clauses wherein the circulating heat exchange fluid is actively circulated.

31. An apparatus as in any of the previous clauses wherein the circulating heat exchange fluid comprises a liquid.

32. An apparatus as in any of the previous clauses wherein the heat exchanger is configured to introduce the liquid into the chamber, and the compressed gas storage unit further comprises a drain.

33. A compressed gas storage module comprising a plurality of compressed gas storage units in selective fluid communication, each compressed gas storage unit having a dimension to allow the compressed gas storage module to conform to a standard form factor.

34. A compressed gas storage module as in clause 33 wherein the standard form factor allows the compressed gas storage module to be transported by road.

35. A compressed gas storage module as in any of the previous clauses wherein the plurality of compressed gas storage units is fabricated by blow molding.

36. A compressed gas storage module as in any of the previous clauses wherein the plurality of compressed gas storage units is fabricated by filament winding.

37. A compressed gas storage module as in any of the previous clauses wherein the plurality of compressed gas storage units are configured to be in selective fluid communication with an energy storage device, and are sized to provide a standard capacity of output power.

Compressed gas storage units according to various embodiments may find particular use in the storage of large volumes of compressed gas in conjunction with energy storage, for example as described in the U.S. Patent Publication No. 2011/0115223 ("the '223 Publication"). This document shows a number of embodiments of compressed gas energy storage systems, including systems utilizing multiple successive expansion and/or compression stages.

Figure 27:
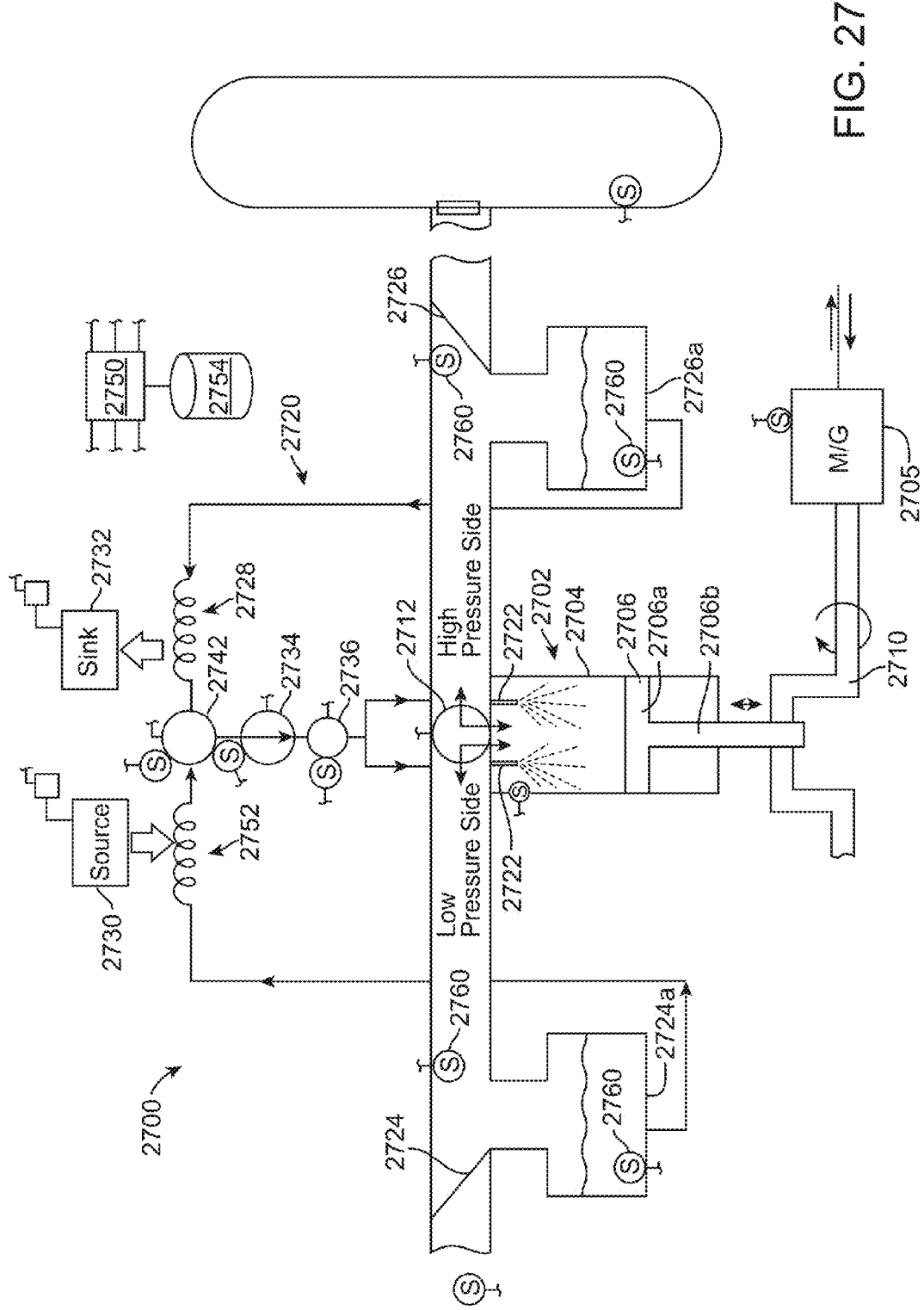
FIG. 27 shows a simplified view of an embodiment of an energy storage system.

FIG. 27 shows a simplified view of one embodiment of such a compressed gas energy system. In particular, the system 2700 includes a compressor/expander 2702 comprising a cylinder 2704 having piston 2706 moveably disposed therein. The head 2706a of the piston is in communication with a motor/generator 2708 through a piston rod 2706b and a linkage 2710 (here a crankshaft).

In a compression mode of operation, the piston may be driven by the motor/generator 2705 acting as a motor to compress gas within the cylinder. The compressed gas may be flowed to a gas storage tank 2770, or may be flowed to a successive higher-pressure stage for additional compression.

In an expansion mode of operation, the piston may be moved by expanding gas within the cylinder to drive the motor/generator acting as a generator. The expanded gas may be flowed out of the system, or flowed to a successive lower-pressure stage for additional expansion.

The cylinder is in selective fluid communication with a high pressure side or a low pressure side through valving 2712. In this particular embodiment, the valving is depicted as a single multi-way valve. However, the present invention is not limited to such a configuration, and alternatives are possible.

For example, in lieu of a single, multi-way valve, some embodiments of the present invention may include the arrangement of multiple one-way, two-way, or three-way valves in series. Examples of valve types which could be suitable for use in accordance with embodiments of the present invention include, but are not limited to, spool valves, gate valves, cylindrical valves, needle valves, pilot valves, rotary valves, poppet valves (including cam operated poppet valves), hydraulically actuated valves, pneumatically actuated valves, and electrically actuated valves (including voice-coil actuated valves).

Certain embodiments may employ gas flow valves as have been employed in steam engine design. Examples of such valves include slide valves (such as D valves), Corliss valves, and others as are described by Joshua Rose, M. E, in Modern Steam Engines, Henry Carey Baird & Co., Philadelphia, Pa. (1887), reprinted by Astragal Press (2003), which is incorporated by reference in its entirety herein for all purposes.

When operating in the compression mode, gas from the low pressure side is first flowed into the cylinder, where it is compressed by action of the piston. The compressed gas is then flowed out of the cylinder to the high pressure side.

When operating in the expansion mode, gas from the high pressure side is flowed into the cylinder, where its expansion drives the piston. The expanded gas is subsequently exhausted from the cylinder to the low pressure side.

Embodiments of the present invention utilize heat exchange between liquid and gas that is undergoing compression or expansion, in order to achieve certain thermodynamic efficiencies. Accordingly, the system further includes a liquid flow network 2720 that includes pump 2734 and valves 2736 and 2742.

The liquid flow network is configured to inject liquid into the cylinder to perform heat exchange with expanding or compressing gas. In this embodiment, the liquid is introduced through nozzles 2722. In other embodiments, a bubbler may be used, with the gas introduced as bubbles through the liquid.

The liquid that has been injected into the cylinder to exchange heat with compressed gas or expanding gas, is later recovered by gas-liquid separators 2724 and 2726 located on the low- and high-pressure sides respectively. Examples of gas-liquid separator designs include vertical type, horizontal type, and spherical type. Examples of types of such gas-liquid separators include, but are not limited to, cyclone separators, centrifugal separators, gravity separators, and demister separators (utilizing a mesh type coalescer, a vane pack, or another structure).

Liquid that has been separated may be stored in a liquid collector section (2724a and 2726a respectively). A liquid collector section of a separator may include elements such as inlet diverters including diverter baffles, tangential baffles, centrifugal, elbows, wave breakers, vortex breakers, defoaming plates, stilling wells, and mist extractors.

The collected separated liquid is then thermally conditioned for re-injection. This thermal conditioning may take place utilizing a thermal network. Examples of components of such a thermal network include but are not limited to liquid flow conduits, gas flow conduits, heat pipes, insulated vessels, heat exchangers (including counterflow heat exchangers), loop heat pipes, thermosiphons, heat sources, and heat sinks.

For example, in an operational mode involving gas compression, the heated liquid collected from gas-liquid separator 2726 is flowed through heat exchanger 2728 that is in thermal communication with heat sink 2732. The heat sink may take one of many forms, including an artificial heat sink in the form of a cooling tower, fan, chiller, or HVAC system, or natural heat sinks in the form of the environment (particularly at high latitudes or altitudes) or depth temperature gradients extant in a natural body of water.

In an operational mode involving gas expansion, the cooled liquid collected from gas-liquid separator 2724 is flowed through heat exchanger 2752 that is in thermal communication with heat source 2730. Again, the heat source may be artificial, in the form of heat generated by industrial processes (including combustion) or other man-made activity (for example as generated by server farms). Alternatively, the heat source may be natural, for example geothermal or solar in nature (including as harnessed by thermal solar systems).

Flows of liquids and/or gases through the system may occur utilizing fluidic and/or pneumatic networks. Examples of elements of fluidic networks include but are not limited to tanks or reservoirs, liquid flow conduits, gas flow conduits, pumps, vents, liquid flow valves, gas flow valves, switches, liquid sprayers, gas spargers, mixers, accumulators, and separators (including gas-liquid separators and liquid-liquid separators), and condensers. Examples of elements of pneumatic networks include but are not limited to pistons, accumulators, gas chambers liquid chambers, gas conduits, liquid conduits, hydraulic motors, hydraulic transformers, and pneumatic motors.

As shown in FIG. 27, the various components of the system are in electronic communication with a central processor 2750 that is in communication with non-transitory computer-readable storage medium 2754, for example relying upon optical, magnetic, or semiconducting principles. The processor is configured to coordinate operation of the system elements based upon instructions stored as code within medium 2754.

The system also includes a plurality of sensors 2760 configured to detect various properties within the system, including but not limited to pressure, temperature, volume, humidity, and valve state. Coordinated operation of the system elements by the processor may be based at least in part upon data gathered from these sensors.

The particular system shown in FIG. 27 represents only one particular embodiment, and alternatives having other features are possible. For example, while FIG. 27 shows an embodiment with compression and expansion occurring in the same cylinder, with the moveable element in communication with a motor/generator, this is not required.

Figure 28:
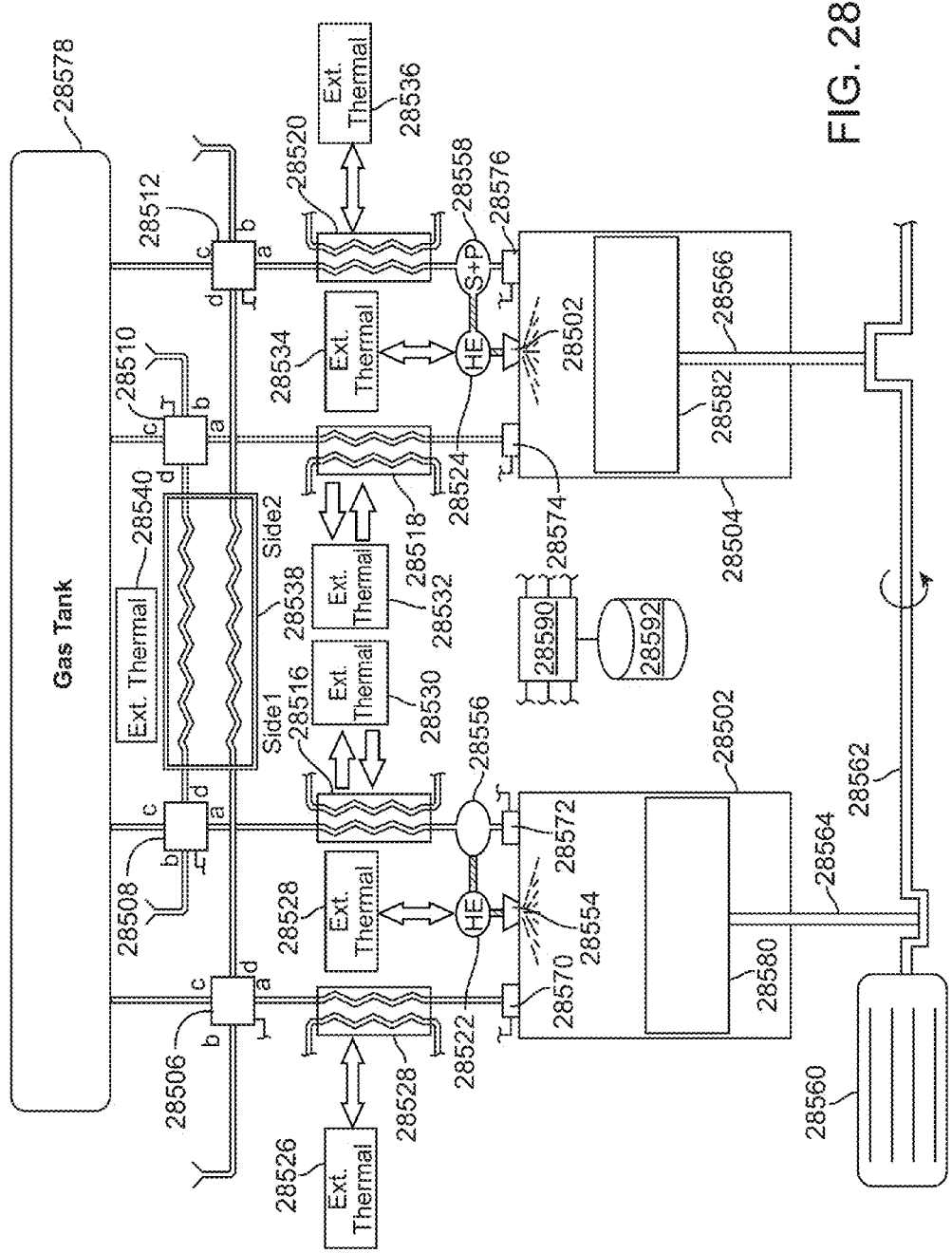
FIG. 28 shows a simplified view of an alternative embodiment of an energy storage system.

FIG. 28 shows an alternative embodiment utilizing two cylinders, which in certain modes of operation may be separately dedicated for compression and expansion. Embodiments employing such separate cylinders for expansion and compression may, or may not, utilize a common linkage (here a mechanical linkage in the form of a rotating crankshaft) with a motor, generator, or motor/generator.

For example, FIG. 28A is a table showing four different basic configurations of the apparatus of FIG. 28. The table of FIG. 28A further indicates the interaction between system elements and various thermal nodes 28625, 28528, 28530, 28532, 28534, 28536, and 28540, in the different configurations. Such thermal nodes can comprise one or more external heat sources, or one or more external heat sinks, as indicated more fully in that table. Examples of such possible such external heat sources include but are not limited to, thermal solar configurations, geothermal phenomena, and proximate heat-emitting industrial processes. Examples of such possible such external heat sinks include but are not limited to, the environment (particularly at high altitudes and/or latitudes), and geothermal phenomena (such as snow or water depth thermal gradients).

Figure 28B:
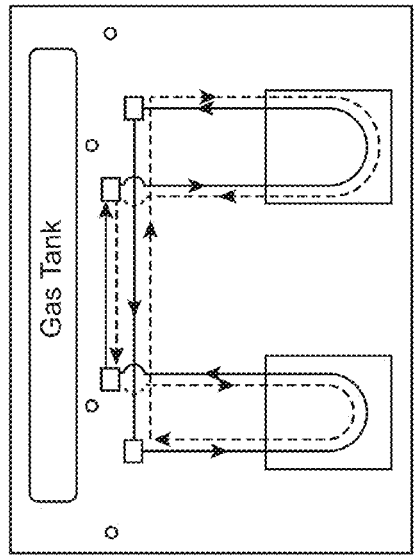
FIGS. 28BA-BF show simplified views of the gas flow paths in various operational modes of the system of FIG. 28.
Figure 28B:
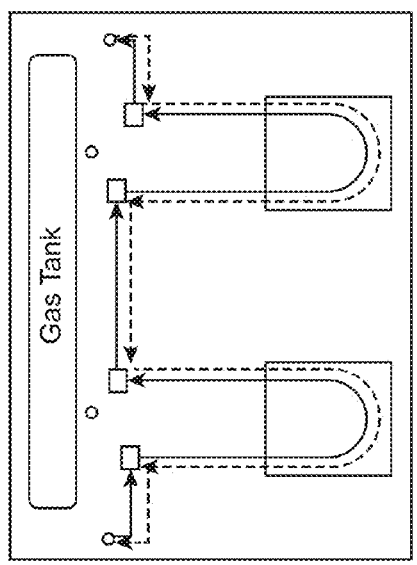
Figure 28B:
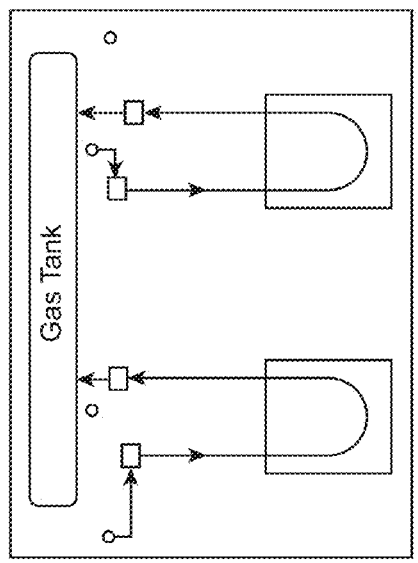
Figure 28B:
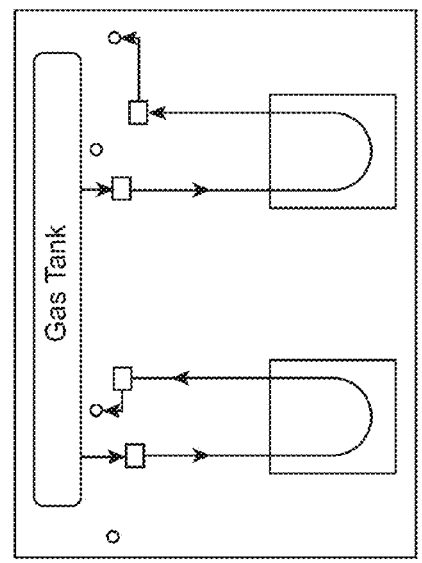
Figure 28B:
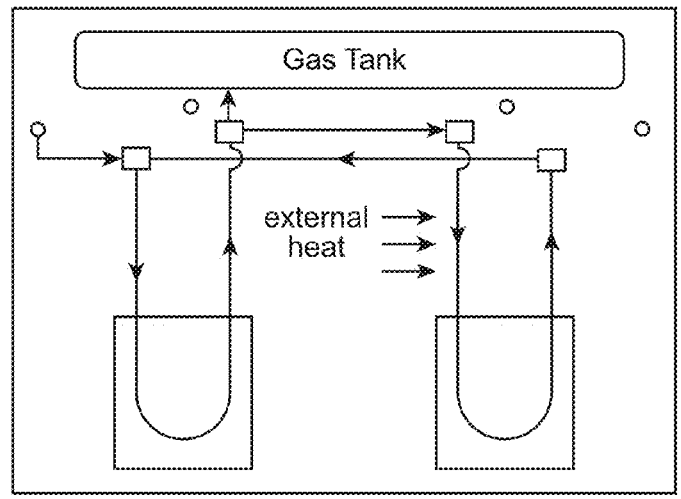
Figure 28B:
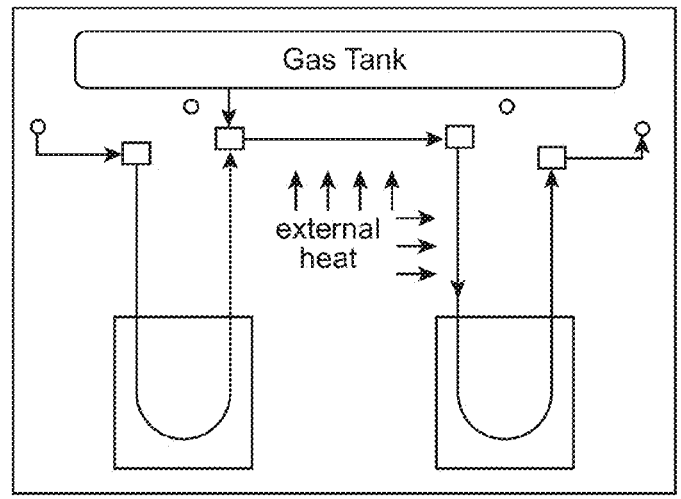

FIGS. 28BA-28BD are simplified views showing the various basic operational modes listed in FIG. 28A. The four different basic modes of operation shown in FIG. 28A may be intermittently switched, and/or combined to achieve desired results. FIGS. 28BE-BF show operational modes comprising combinations of the basic operational modes.

One possible benefit offered by the embodiment of FIG. 28 is the ability to provide cooling or heating on demand. Specifically, the change in temperature experienced by an expanding or compressed gas, or an injected liquid exchanging heat with such an expanding or compressed gas, can be used for temperature control purposes. For example, gas or liquid that is cooled by expansion, could be flowed to a building HVAC system. Conversely, the increase in temperature experienced by a compressed gas, or a liquid exchanging heat with a compressed gas, can be used for heating.

By providing separate, dedicated cylinders for gas compression or expansion, embodiments according to FIG. 28 may provide such temperature control on-demand, without reliance upon a previously stored supply of compressed gas. In particular, the embodiment of FIG. 9 allows cooling based upon immediate expansion of gas compressed by the dedicated compressor.

While FIGS. 27-28 show embodiments involving the movement of a solid, single-acting piston, this is not required. Alternative embodiments could utilize other forms of moveable elements. Examples of such moveable elements include but are not limited to double-acting solid pistons, liquid pistons, flexible diaphragms, screws, turbines, quasi-turbines, multi-lobe blowers, gerotors, vane compressors, and centrifugal/axial compressors. Where a solid piston is used, a piston rod and/or crosshead may also be employed.

Moreover, embodiments may communicate with a motor, generator, or motor/generator, through other than mechanical linkages. Examples of alternative linkages which may be used include but are not limited to, hydraulic/pneumatic linkages, magnetic linkages, electric linkages, and electro-magnetic linkages.

While the particular embodiments of FIGS. 27-28 show a piston in communication with a motor generator through a mechanical linkage in the form of a crankshaft, this is not required. Alternative embodiments could utilize other forms of mechanical linkages, including but not limited to gears such as multi-node gearing systems (including planetary gear systems). Examples of mechanical linkages which may be used include shafts such as crankshafts, gears, chains, belts, driver-follower linkages, pivot linkages, Peaucellier-Lipkin linkages, Sarrus linkages, Scott Russel linkages, Chebyshev linkages, Hoekins linkages, swashplate or wobble plate linkages, bent axis linkages, Watts linkages, track follower linkages, and cam linkages. Cam linkages may employ cams of different shapes, including but not limited to sinusoidal and other shapes. Various types of mechanical linkages are described in Jones in "Ingenious Mechanisms for Designers and Inventors, Vols. I and II", The Industrial Press (New York 1935), which is hereby incorporated by reference in its entirety herein for all purposes.

In certain embodiments of the present invention, it may be important to control the amount of liquid introduced into the chamber to effect heat exchange. The ideal amount may depends on a number of factors, including the heat capacities of the gas and of the liquid, and the desired change in temperature during compression or expansion.

The amount of liquid to be introduced may also depend on the size of droplets formed by the spray nozzle. One measure of the amount of liquid to be introduced, is a ratio of the total surface area of all the droplets, to the number of moles of gas in the chamber. This ratio, in square meters per mole, could range from about 1 to 250 or more. Examples of this ratio which may be suitable for use in embodiments of the present invention include 1, 2, 5, 10, 15, 25, 30, 50, 100, 125, 150, 200, or 250.

Embodiments of spray nozzles according to the present invention may exhibit particular performance characteristics. Examples of performance characteristics include breakup length, spray pattern, spray cone angle, fan angle, angle to surface (for fan sprays), and droplet spatial distribution.

One performance characteristic is droplet size. Droplet size may be measured using DV50, Sauter mean diameter (also called SMD, D32, $d_{32}$ or D[3, 2]), or other measures. Embodiments of nozzles according to the present invention may produce liquid droplets having SMD's within a range of between about 10-200 um. Examples of droplet sizes produced by embodiments of nozzles according to the present invention include but are not limited to those having a SMD of about 200 microns, 150 microns, 100 microns, 50 microns, 25 microns, and 10 microns.

Another performance characteristic of liquid spray nozzles according to embodiments of the present invention, is flow rate. Embodiments according to the present invention may produce a flow rate of between about 20 and 0.01 liters per second. Examples of flow rates of embodiments of nozzles according to the present invention are 20, 10, 5, 2, 1, 0.5, 0.25, 0.1, 0.05, 0.02, and 0.01 liters per second.

Another performance characteristic of liquid spray nozzles according to embodiments of the present invention, is breakup length. Liquid output by embodiments of nozzles according to the present invention may exhibit a breakup length of between about 1-100 mm. Examples of breakup lengths of sprays of liquid from nozzles according to the present invention include 100, 50, 25, 10, 5, 2, and 1 mm.

Embodiments of nozzles according to the present invention may produce different types of spray patterns. Examples of spray patterns which may be produced by nozzle embodiments according to the present invention include but are not limited to, hollow cone, solid cone, stream, single fan, and multiple fans.

Embodiments of nozzles according to the present invention may produce spray cone angles of between about 20-180 degrees. Examples of such spray cone angles include but are not limited to 20°, 22.5°, 25°, 30°, 45°, 60°, 90°, 120°, 150°, and 180°.

Embodiments of nozzles according to the present invention may produce spray fan angles of between about 20-360 degrees. Examples of such fan angles include but are not limited to 20°, 22.5°, 25°, 30°, 45°, 60°, 90°, 120°, 150°, 180°, 225°, 270°, 300°, 330°, or 360°. Examples of fan spray angles to surface possibly produced by embodiments of the present invention, include but are not limited to 90°, 80°, 60°, 45°, 30°, 22.5°, 20°, 15°, 10°, 5°, or 0°.

Droplet spatial distribution represents another performance characteristic of liquid spray nozzles according to embodiments of the present invention. One way to measure droplet spatial distribution is to measure the angle of a sheet or cone cross-section that includes most of the droplets that deviate from the sheet. In nozzle designs according to embodiments of the present invention, this angle may be between 0-90 degrees. Examples of such angles possibly produced by embodiments of the present invention include but are not limited to 0°, 1°, 2°, 5°, 7.5°, 10°, 15°, 20°, 25°, 30°, 45°, 60°, 75°, or 90°.

Certain nozzle designs may facilitate the fabrication of individual nozzles. Certain nozzle designs may also permit the placement of a plurality of nozzles in a given surface proximate to one another, which can enhance performance.

In particular embodiments, sprays of liquid from two or even more of the nozzles may overlap with each other in certain regions. This overlap creates the potential that the liquid spray droplets will collide with each other, thereby further breaking them up into smaller sizes for heat exchange.

Nozzles may be positioned on one or more surfaces within a cylinder. Nozzles may be positioned to inject liquid in directions substantially parallel to, or orthogonal to, directions of motion of a moveable member within a chamber, and/or directions of gas inlet into a chamber.

The flexibility in fabrication and placement of a plurality of spray nozzles, may offer additional enhancements to performance. For example, in certain embodiments the orientation of the dimensional axis of spray structures relative to a direction of piston movement and/or a direction of gas inflow, may be uniform or non-uniform relative to other spray structures.

Thus in certain embodiments, the dimensional axis of the spray structures could each be offset from a gas flow direction in a consistent manner, such that they combine to give rise to a bulk effect such as swirling. In other embodiments, the dimensional axis of the spray structures could be oriented in a non-uniform relative to certain direction, in a manner that is calculated to promote interaction between the gas and the liquid droplets. Such interaction could enhance homogeneity of the resulting mixture, and the resulting properties of the heat exchange between the gas and liquid of the mixture.

In certain embodiments, one or more spray nozzles may be intentionally oriented to direct a portion of the spray to impinge against the chamber wall. Such impingement may serve to additionally break up the spray into smaller droplets over a short distance.

While the '223 Publication has focused upon the use of compressed gas for energy storage applications, embodiments are not limited to this particular application, and could be applied to other fields involving the storage of compressed gases.

For instance, compressed air may be utilized as an energy source for a variety of different industrial applications. Examples of such applications include but are not limited to painting, combustion (e.g. turbines, blast furnaces), and powering pneumatically-driven tools such as drills and hammers.

In such applications, the compressed gas storage unit may be configured to perform certain additional functions, such as conditioning the gas prior to, during, or subsequent to its storage. For example, according to certain embodiments compressed air may be dried prior to its deployment in a pneumatic system.

In another example, compressed gas may be partially expanded from a high storage pressure in order to render it useful for certain applications. Thus while air may be compressed to a pressure of 3000 psig for storage purposes, prior to being used to operate pneumatic tools it may need to be expanded to reach a lower pressure (e.g. a shop pressure of 500 psig).

Figure 30:
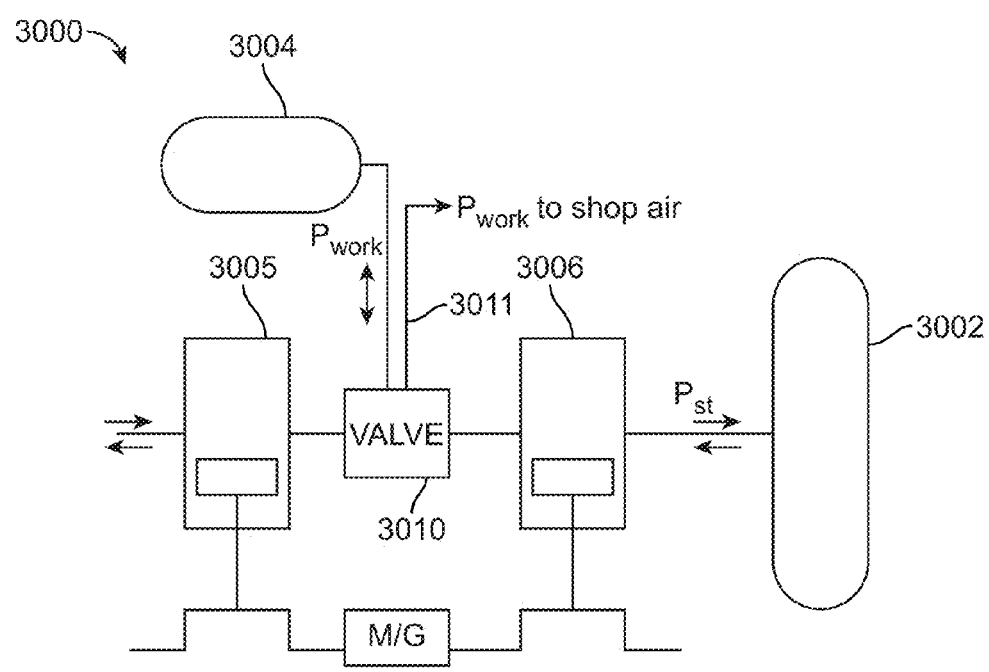
FIG. 30 shows a simplified view of an embodiment of a configuration that may be used in pneumatic applications.

FIG. 30 shows an embodiment of a system that may be suited for such a pneumatic application. The system 3000 comprises multiple gas storage units 3002 and 3004: High pressure gas storage unit 3002 is configured to receive and efficiently store gas at high pressure ($P_{St}$) as a result of serial compression by a low pressure stage 3005 and a high pressure stage 3006.

Low pressure gas storage unit 3004 is configured to receive gas at a lower pressure ($P_{Work}$). Such gas may be partially expanded from the high pressure stage 3002, or gas that has been compressed only by the low pressure stage 3005. The low pressure gas may be flowed via valve 3010 through conduit 3011 to a pneumatic system (e.g. shop air system) in order to power various functionalities (e.g. painting, drilling, etc.). Where the low pressure gas is obtained by partial expansion in a high pressure stage (rather than by only partial compression by a lower pressure stage), that partial expansion can provide desired electrical power and/or cooling functions.

Still another gas conditioning function which can be integrated with a storage unit according to various embodiments, is gas-liquid separation. Such separation may be particularly useful where the gas has been compressed in the presence of liquid as a heat exchange medium, for example as part of a near-isothermal compression process. Other gas conditioning functions that can be implemented in a storage unit structure can include gas filtering and/or thermal conditioning. In connection with the latter, heat exchangers may be incorporated into the gas storage unit.

Yet another function which can be integrated into a storage unit according to various embodiments, is pressure stabilization. In particular, the compressed gas storage unit features a structure to ensure substantially constant internal pressure.

According to some embodiments, this structure may comprise a solid partition such as a wall or a flexible diaphragm (e.g. bladder), that is moveable within the storage unit in order to adjust its effective volume available to receive compressed gas. Alternatively, this structure may comprise liquid moveable into and out of the storage unit, again to adjust the effective volume that is available to receive and hold the compressed gas.

What is claimed is:

1. A compressed gas storage unit comprising:
   a molded plastic liner defining an internal chamber; and
   a wound filament in contact with the molded plastic liner, wherein the molded plastic liner comprises a first blow molded shell of a first material, and wherein the molded plastic liner includes a safety feature to ensure that the liner will leak at a pressure lower than a burst pressure of the wound filament.

2. A compressed gas storage unit as in claim 1 wherein the first blow molded shell is successively blow molded within a second blow molded shell of the first material in a same mold.

3. A compressed gas storage unit as in claim 1 wherein the molded plastic liner is molded within the wound filament.

4. A compressed gas storage unit as in claim 2 further comprising at least a portion of the same mold.

5. A compressed gas storage unit as in claim 1 wherein the safety feature comprises the molded plastic liner comprising two or more pieces connected by a joint configured to leak at the pressure lower than the burst pressure of the wound filament.

* * * * *